(12) United States Patent
Hirose et al.

(10) Patent No.: US 9,383,055 B2
(45) Date of Patent: Jul. 5, 2016

(54) IN-PIPE TRAVELING APPARATUS AND TRAVELING MODULE

(71) Applicant: HiBot Corp., Tokyo (JP)

(72) Inventors: Shigeo Hirose, Tokyo (JP); Paulo Debenest, Tokyo (JP); Michele Guarnieri, Tokyo (JP)

(73) Assignee: HiBot Corp., Shinagawa-ku (JP)

( * ) Notice: Subject to any disclaimer, the term of this patent is extended or adjusted under 35 U.S.C. 154(b) by 0 days.

(21) Appl. No.: 14/403,161

(22) PCT Filed: Nov. 15, 2012

(86) PCT No.: PCT/JP2012/079712
§ 371 (c)(1),
(2) Date: Nov. 21, 2014

(87) PCT Pub. No.: WO2014/076806
PCT Pub. Date: May 22, 2014

(65) Prior Publication Data
US 2015/0107485 A1    Apr. 23, 2015

(51) Int. Cl.
*F16L 55/40* (2006.01)
*B61B 13/10* (2006.01)
(Continued)

(52) U.S. Cl.
CPC ............ *F16L 55/40* (2013.01); *B61B 13/10* (2013.01); *F16L 55/265* (2013.01); *F16L 55/32* (2013.01); *F16L 2101/30* (2013.01)

(58) Field of Classification Search
CPC .................. F16L 55/40; B61B 13/10
USPC .......................... 104/138.2, 138.1
See application file for complete search history.

(56) References Cited

U.S. PATENT DOCUMENTS 2,742,259 A * 4/1956 Boucher ............... F16L 55/30
                                                        104/138.2
4,862,808 A * 9/1989 Hedgcoxe ............. B25J 5/007
                                                        104/138.2
(Continued)

FOREIGN PATENT DOCUMENTS

JP     62-176073 U    11/1987
JP     05-185931 A    7/1993
(Continued)

OTHER PUBLICATIONS

A snake-like robot for internal inspection of complex pipe structures (PIKo) by Sigurd A. Fjerdingen et al, The 2009 IEEE/RSJ International Conference on Intelligent Robots and Systems, Oct. 11-15, 2009 St. Louis, USA.

*Primary Examiner* — Jason C Smith
(74) *Attorney, Agent, or Firm* — Masuvalley & Partners

(57) ABSTRACT

An object of the invention is to provide an in-pipe traveling apparatus and a traveling module is provided, having a simple structure but capable of operating with a short overall traveling path and setting a large drive force for forward and backward traveling operation. The In one embodiment, the in-pipe traveling apparatus includes at least three traveling modules capable of passing through a pipe. Each of the traveling modules includes a traveling module body, a pair of traveling wheels provided in the traveling module body on one side thereof in a traveling direction, a drive member that drives the pair of traveling wheels in such a way that the traveling wheels rotate, a connection member that connects the traveling module to another traveling module in a bendable manner in a pitching direction, and a swing member that causes the adjacent traveling module to swing in a yawing direction.

3 Claims, 24 Drawing Sheets

(51) Int. Cl.
*F16L 55/26* (2006.01)
*F16L 55/32* (2006.01)
*F16L 101/30* (2006.01)

(56) References Cited

U.S. PATENT DOCUMENTS

| | | | | |
|---|---|---|---|---|
| 5,172,639 | A * | 12/1992 | Wiesman | F16L 55/28 104/138.2 |
| 5,220,869 | A * | 6/1993 | Pelrine | B62D 57/024 104/138.2 |
| 5,284,096 | A * | 2/1994 | Pelrine | B62D 49/04 104/138.2 |
| 5,309,844 | A * | 5/1994 | Zollinger | F16L 55/30 104/138.2 |
| 5,371,363 | A * | 12/1994 | Lilimpakis | G01T 1/169 104/138.2 |
| 5,601,025 | A * | 2/1997 | Box | F16L 55/34 104/138.2 |
| 5,776,080 | A * | 7/1998 | Thome | A61M 25/0127 600/585 |
| 5,878,783 | A * | 3/1999 | Smart | F16L 55/28 104/138.2 |
| 5,971,404 | A * | 10/1999 | Stoves | F16L 55/28 104/138.2 |
| 6,019,048 | A * | 2/2000 | Seeberger | F16L 55/28 104/138.2 |
| 6,035,786 | A * | 3/2000 | McKay | F16L 55/28 104/138.1 |
| 6,123,027 | A * | 9/2000 | Suyama | F16L 55/28 104/138.2 |
| 6,339,993 | B1 * | 1/2002 | Comello | F16L 55/28 104/138.2 |
| 6,450,104 | B1 * | 9/2002 | Grant | B08B 9/049 104/138.1 |
| 6,667,677 | B2 * | 12/2003 | Yajima | H01F 7/081 335/220 |
| 6,689,119 | B1 * | 2/2004 | Di Caprio | A61M 25/0127 600/585 |
| 7,954,575 | B1 * | 6/2011 | Bloxsom | H02G 1/088 104/138.1 |
| 8,402,911 | B1 * | 3/2013 | Weisenberg | F16L 55/265 104/138.2 |
| 2003/0214580 | A1 * | 11/2003 | Iddan | G02B 23/2476 348/81 |
| 2005/0284233 | A1 * | 12/2005 | Teraura | A61B 1/00156 73/779 |
| 2006/0213388 | A1 * | 9/2006 | Louis | F16L 55/28 104/138.2 |
| 2007/0151475 | A1 * | 7/2007 | Nicholson | B08B 9/035 104/138.2 |
| 2008/0115606 | A1 * | 5/2008 | Suzuki | A61B 1/00147 74/111 |
| 2008/0245258 | A1 * | 10/2008 | Herron | F16L 55/32 104/138.2 |
| 2011/0011299 | A1 * | 1/2011 | Beck | F16L 55/28 104/138.2 |
| 2011/0073001 | A1 * | 3/2011 | Louis | F16L 55/28 104/138.2 |
| 2012/0090498 | A1 * | 4/2012 | Redpath | B08B 9/049 104/138.2 |
| 2014/0165869 | A1 * | 6/2014 | Flanery | F16L 55/265 104/138.2 |
| 2014/0165870 | A1 * | 6/2014 | Bichler | E03F 3/06 104/138.2 |
| 2015/0107485 | A1 * | 4/2015 | Hirose | F16L 55/40 105/3 |

FOREIGN PATENT DOCUMENTS

| | | |
|---|---|---|
| JP | 05-185964 A | 7/1993 |
| JP | 08-133073 A | 5/1996 |
| JP | 09-226570 A | 9/1997 |
| JP | 2009-1069 A | 1/2009 |
| JP | 2012-076475 A | 4/2012 |

* cited by examiner

IN-PIPE TRAVELING APPARATUS AND TRAVELING MODULE

CROSS-REFERENCE TO RELATED APPLICATIONS

This application is the national phase entry under 35 U.S.C. §371 of International Application No. PCT/JP2012/079712, filed on Nov. 15, 2012, the contents of which are hereby incorporated by reference in their entirety for all purposes.

TECHNICAL FIELD

The present invention relates to an in-pipe traveling apparatus capable of traveling forward and backward through a pipe, and particularly to an in-pipe traveling apparatus and a traveling module capable of moving in an arbitrary direction at a junction in a pipe.

BACKGROUND ART

In pipe arrangements in a chemical plant and those for fuel gases, water supply, and other purposes, it is necessary to inspect the state of the interior of pipes regularly or at an arbitrary point of time to check, for example, whether or not dirt has adhered to the inner surface of each of the pipes and whether or not the pipes have cracked from the viewpoints of safety, quality control, and other points.

PTL 1 and NPTL 1 describe examples of an apparatus for inspecting the inner surface of a pipe while moving through the pipe.

CITATION LIST

Patent Literature

PTL 1: Japanese Patent Laid-Open No. 2012-76475 Non-Patent Literature
NPTL 1: A snake-like robot for internal inspection of complex pipe structures (PIKo), The 2009 IEEE/RSJ International Conference on Intelligent Robots and Systems, Oct. 11-15, 2009 St. Louis, USA

SUMMARY OF INVENTION

Technical Problem

PTL1 describes a pipe inspection apparatus including at least one drive unit and at least one inspection unit and capable of being inserted into a pipe under inspection. The drive unit has a plurality of drive sections, a plurality of connection sections that interconnect the drive sections, two manipulation cables that pass through the drive sections and the connection sections, and a tension adjustment section that adjusts the tension of each of the manipulation cables, and each of the drive sections has a wheel shaft that can be rotated with a motor and wheels attached to the wheel shaft. In the pipe inspection apparatus, when the two manipulation cables are pulled with the same amount of force, the drive unit is zigzagged and moves forward with the wheels being in contact with the inner surface of the pipe. Further, when the two manipulation cables are pulled with different amounts of tension, the drive unit is zigzagged and helically shaped and travels along a helical path with the wheels of the drive sections being in contact with the inner surface of the pipe.

In the pipe inspection apparatus described in PTL1, however, a single drive unit is formed of a traveling module connected unit in which a plurality of traveling modules each having a pair of wheels are swingably interconnected in line and a tension adjustment section disposed on one side of the traveling module connected unit. The tension adjustment section has reels for winding the manipulation cables and a pair of wheels and is capable of switching the winding direction of each of the reels back and forth to change the balance between the tensions of the manipulation cables.

When the drive unit of the pipe inspection apparatus is used in a pipe structure having a horizontal segment bent in an L-like shape and a vertical linear segment extending in the vertical direction from an intermediate linear segment on one side of the horizontal segment, the entire single drive unit needs to be within the intermediate linear segment before the drive unit passes along the intermediate linear segment and enters the vertical linear segment. The reason for this is that the drive unit is allowed to travel by adjusting the tension of each of the two manipulation cables. As a result, the single drive unit requires a long traveling path, and the intermediate linear segment of the pipe cannot therefore undesirably be shortened.

Further, since the force that drives the apparatus is produced by changing the magnitude of the tension of each of the pair of manipulation cables, the manipulation cables undesirably rub against corners of the traveling modules, possibly resulting in breakage of the cables at the rubbed portions. The pair of manipulation cables cannot therefore be pulled or released with a large tensile force, undesirably resulting in an insufficient amount of swing motion of traveling adjacent modules.

NPTL 1 describes a snake-like robot for internal inspection of complex pipe structures. The snake-like robot is so configured that five traveling modules are arranged in line in the traveling direction with adjacent traveling modules on one side interconnected in a the horizontally swingable manner and adjacent traveling modules on the other side interconnected in a vertically swingable manner. Two pairs of wheels (four in total) are disposed in each of the traveling modules in a substantially central portion thereof in the traveling direction in such a way that the wheels face each other in the rightward/leftward and upward/downward directions. Swinging the two pairs of wheels in the horizontal direction and driving the two pairs of wheels forward or backward allows generation of serpentine motion, which moves the robot forward or backward.

In the thus configured snake-like robot, however, since the center of the swing motion is set substantially at the center of each of the traveling modules, adjacent traveling modules cannot be swung by a large angle therebetween. The snake-like robot therefore undesirably requires a long overall traveling path, as the pipe inspection apparatus described above does.

An object of the invention is to provide an in-pipe traveling apparatus capable of moving in an arbitrary direction at a junction of a pipe, having a simple structure but capable of operating with a short overall traveling path and generating a large drive force for forward and backward traveling operation, and also to provide a traveling module used in the in-pipe traveling apparatus.

Solution to Problem

An in-pipe traveling apparatus according to the invention comprises at least three traveling modules capable of passing through a pipe. Each of the traveling modules includes a traveling module body inserted into a pipe, a pair of traveling wheels inserted into the pipe and provided in the traveling module body on one side thereof in a traveling direction, a drive member that drives the pair of traveling wheels in such a way that the traveling wheels rotate, a connection member provided in the traveling module body and connecting the traveling module to another traveling module in a bendable manner in a pitching direction, and a swing member that causes the adjacent traveling module connected via the connection member to swing in a yawing direction. The connection member has a first member provided in the traveling module body on one side thereof in the traveling direction and a second member provided in the traveling module body on the other side thereof in the traveling direction, and all the traveling modules are interconnected in line via the connection members to form a traveling module connected unit. An elastic member is so provided that the elastic member is interposed between adjacent traveling modules in the traveling module connected unit, and a spring force of the elastic member is used to elastically bend the traveling module connected unit in the pitching direction. Further, a pair of idler wheels are rotatably provided in the traveling module connected unit on the side thereof away from the traveling wheels on the one side in the traveling direction.

Each pair of the plurality of traveling wheels and the idler wheels is so disposed on the traveling module connected unit on opposite sides thereof in a direction that intersects the traveling direction and so formed that outer surfaces of the wheels as a whole form part of a sphere.

The first member is formed of an end surface bracket pivotally supported by the traveling module body, and the second member is formed of a swingable bracket swingably supported by the traveling module body. In adjacent traveling modules in the traveling module connected unit, the end surface bracket of a traveling module is fixed to the swingable bracket of an adjacent traveling module, and the swingable bracket is fixed to the end surface bracket of another adjacent traveling module. A drive system that produces swing motion in a yawing direction is provided between the first member and the second member.

The elastic member is formed of a coil spring. One end of each of the coil springs is locked to the corresponding traveling module body, and the other ends of the coil springs are twisted alternately in opposite directions and caused to engage with the respective first member, so that the spring forces of the coil springs that are present between the adjacent traveling modules act alternately in a direction opposite to a tangential direction to bend the traveling module connected unit zigzag.

A traveling module comprises: a traveling module body inserted into a pipe; a pair of traveling wheels inserted into the pipe and provided in the traveling module body on one side thereof in a traveling direction; a drive member that drives the pair of traveling wheels in such a way that the traveling wheels rotate; a connection member provided in the traveling module body and connecting the traveling module to another traveling module in a bendable manner in a pitching direction; and a swing member that causes the adjacent traveling module connected via the connection member to swing in a yawing direction. The connection member has a first member provided in the traveling module body on one side thereof in the traveling direction and a second member provided in the traveling module body on the other side thereof in the traveling direction.

Advantageous Effects of Inventions

The invention can provide an in-pipe traveling apparatus having a simple structure but capable of operating with a short overall traveling path and generating a large drive force for forward and backward traveling operation, and also provide a traveling module used in the in-pipe traveling apparatus.

BRIEF DESCRIPTION OF DRAWINGS

FIG. 11 shows an extended state of a traveling module connected unit (state in which no spring force of elastic member is exerted) according to the embodiment of the in-pipe traveling apparatus of the invention, in which

FIG. 12 shows a contracted state of the traveling module connected unit (state in which spring force of elastic member is exerted, that is, a case where traveling module connected unit is zigzagged in pitching direction in serpentine shape) according to the embodiment of the in-pipe traveling apparatus of the invention, in which

FIG. 14 shows a horizontally zigzagged state of the traveling module connected unit (case where traveling module connected unit is zigzagged in yawing direction in serpentine shape) according to the embodiment of the in-pipe traveling apparatus of the invention, in which

FIG. 15 describes a state in which the traveling module connected unit according to the embodiment of the in-pipe traveling apparatus of the invention travels straight through a pipe, in which FIG. 15A is a cross-sectional view of first traveling wheels, FIG. 15B is a cross-sectional view of second traveling wheels, FIG. 15C is a cross-sectional view of third traveling wheels, FIG. 15D is a cross-sectional view of fourth traveling wheels, and FIG. 15E is a cross-sectional view of fifth traveling wheels;

FIG. 16 describes a state in which the traveling module connected unit according to the embodiment of the in-pipe traveling apparatus of the invention moves through a pipe along a zigzag path, in which FIG. 16A is a cross-sectional view of the first traveling wheels, FIG. 16B is a cross-sectional view of the second traveling wheels, FIG. 16C is a cross-sectional view of the third traveling wheels, FIG. 16D is a cross-sectional view of the fourth traveling wheels, and FIG. 16E is a cross-sectional view of the fifth traveling wheels;

FIG. 18 describes how the traveling module connected unit according to the embodiment of the in-pipe traveling apparatus of the invention operates, in which

FIG. 19 describes how the traveling module connected unit according to the embodiment of the in-pipe traveling apparatus of the invention operates, in which

FIG. 20 describes how the traveling module connected unit according to the embodiment of the in-pipe traveling apparatus of the invention operates, in which

FIG. 21 describes how the traveling module connected unit according to the embodiment of the in-pipe traveling apparatus of the invention operates, in which

FIG. 22 describes how the traveling module connected unit according to the embodiment of the in-pipe traveling apparatus of the invention operates, in which

DESCRIPTION OF EMBODIMENTS

Figure 1:
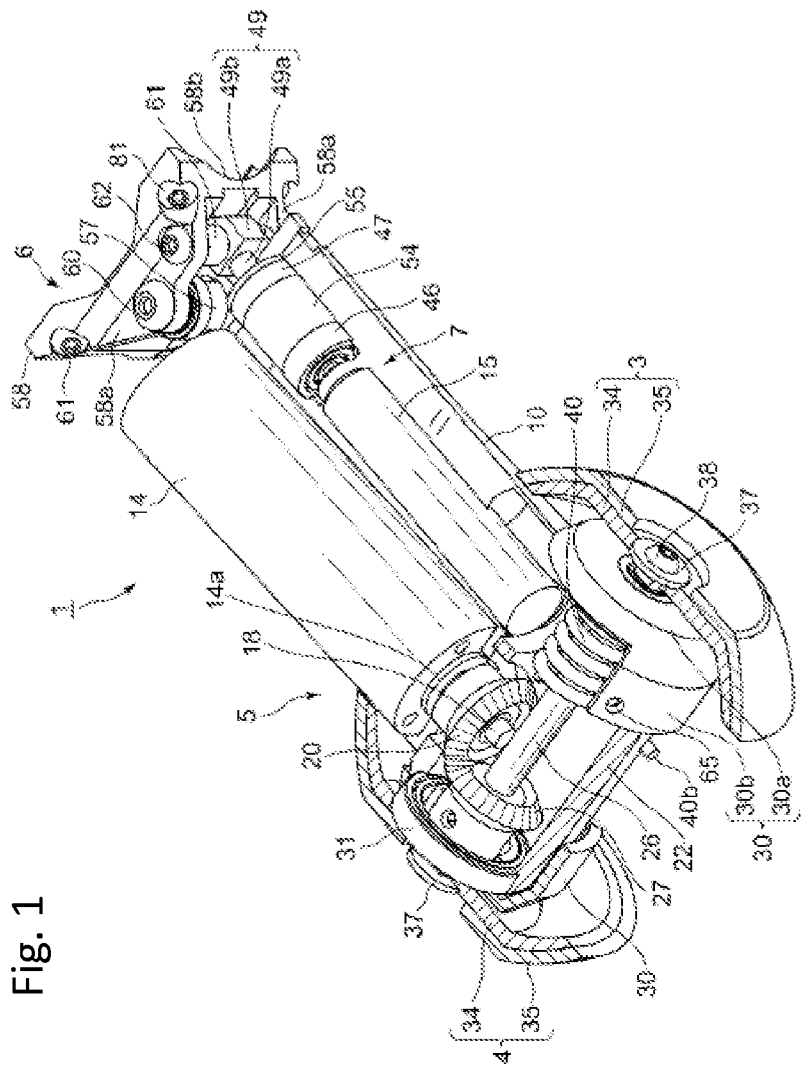
FIG. 1 is a perspective view showing an embodiment of a traveling module used in an in-pipe traveling apparatus according to the invention.
Figure 2:
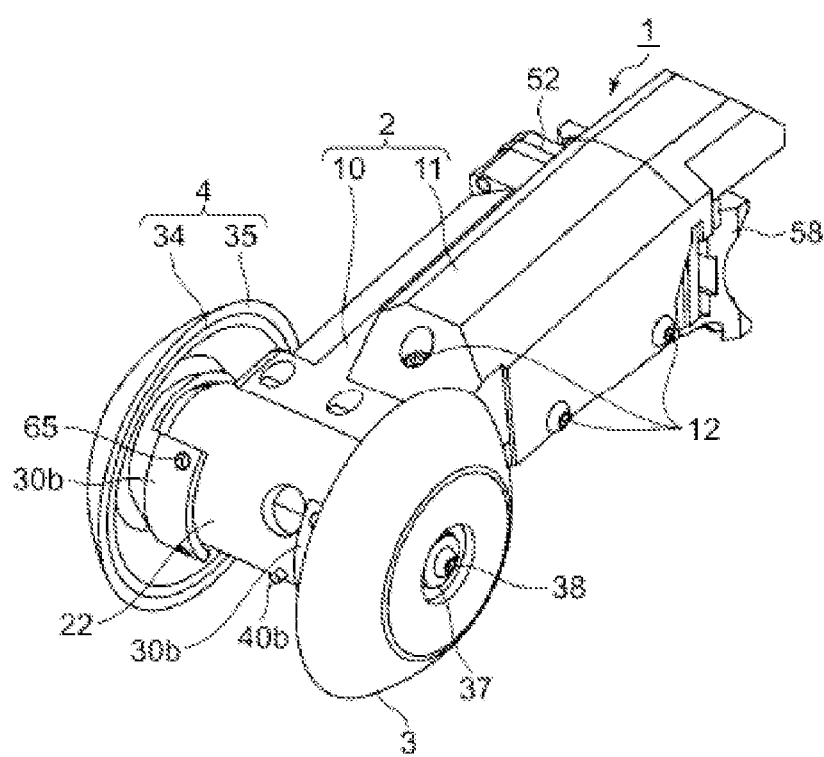
FIG. 2 is a perspective semi-plan view of the embodiment of the traveling module used in the in-pipe traveling apparatus according to the invention.
Figure 3:
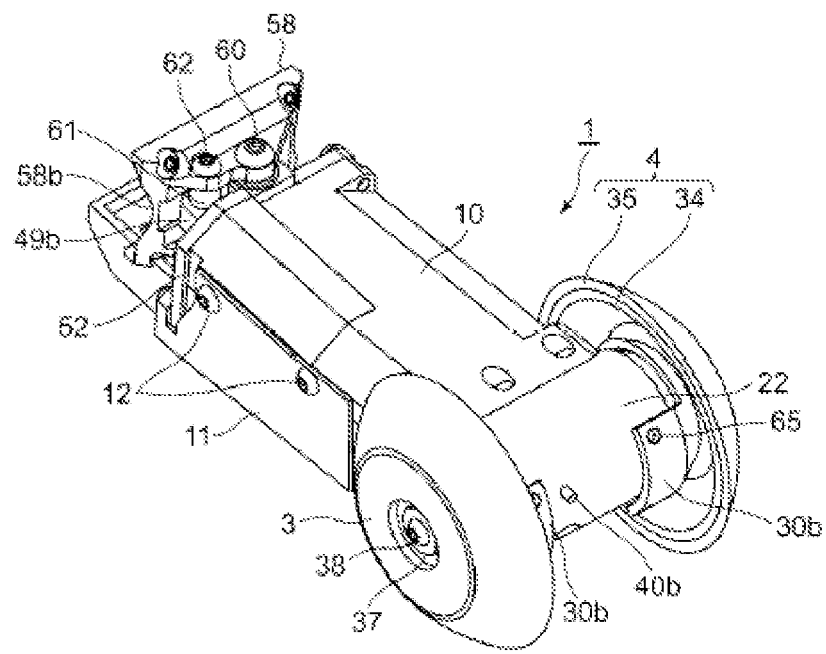
FIG. 3 is a perspective semi-bottom view of the embodiment of the traveling module used in the in-pipe traveling apparatus according to the invention.
Figure 4:
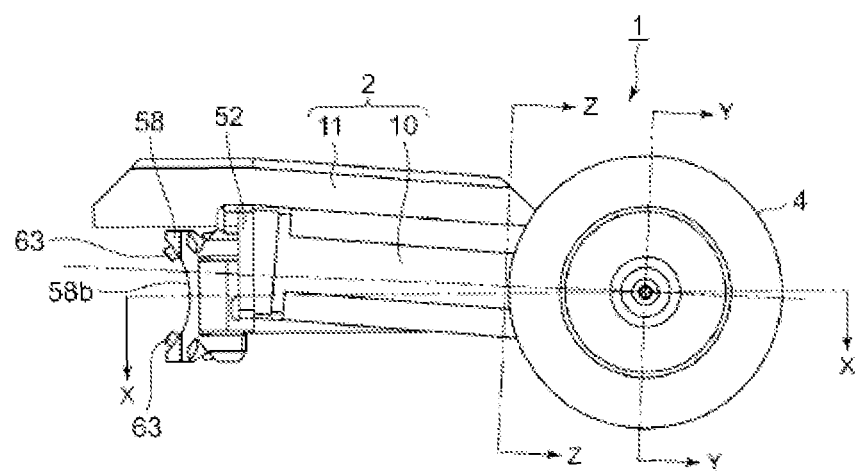
FIG. 4 is a front view of the embodiment of the traveling module used in the in-pipe traveling apparatus according to the invention.
Figure 5:
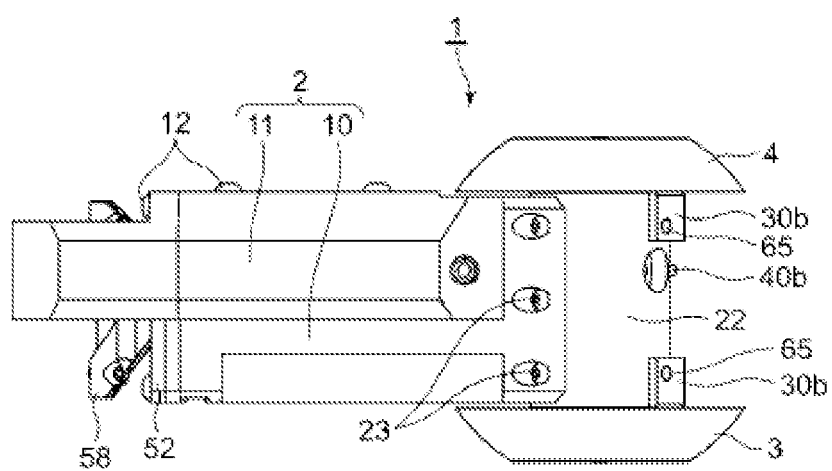
FIG. 5 is a plan view of the embodiment of the traveling module used in the in-pipe traveling apparatus according to the invention.

Embodiments of an in-pipe traveling apparatus, a traveling module connected unit, and a traveling module according to the invention will be described below with reference to FIGS. 1 to 24. The traveling module connected unit according to the in-pipe traveling apparatus of the invention includes at least three traveling modules. In the following embodiment, the number of traveling modules is four. It is, however, noted that a single traveling module connected unit can instead be formed of three traveling modules or five or more traveling modules.

A traveling module 1 will first be described. The traveling module 1 includes a traveling module body 2, a pair of traveling wheels 3, 4, a drive member 5, which drives the pair of traveling wheels 3, 4 in such a way that they rotate, a connection member 6, which connects the traveling module 1 to another traveling module 1 in a swingable manner, and a swing member 7, which causes the adjacent traveling modules 1 to swing, as shown in FIGS. 1 to 10.

Figure 10:
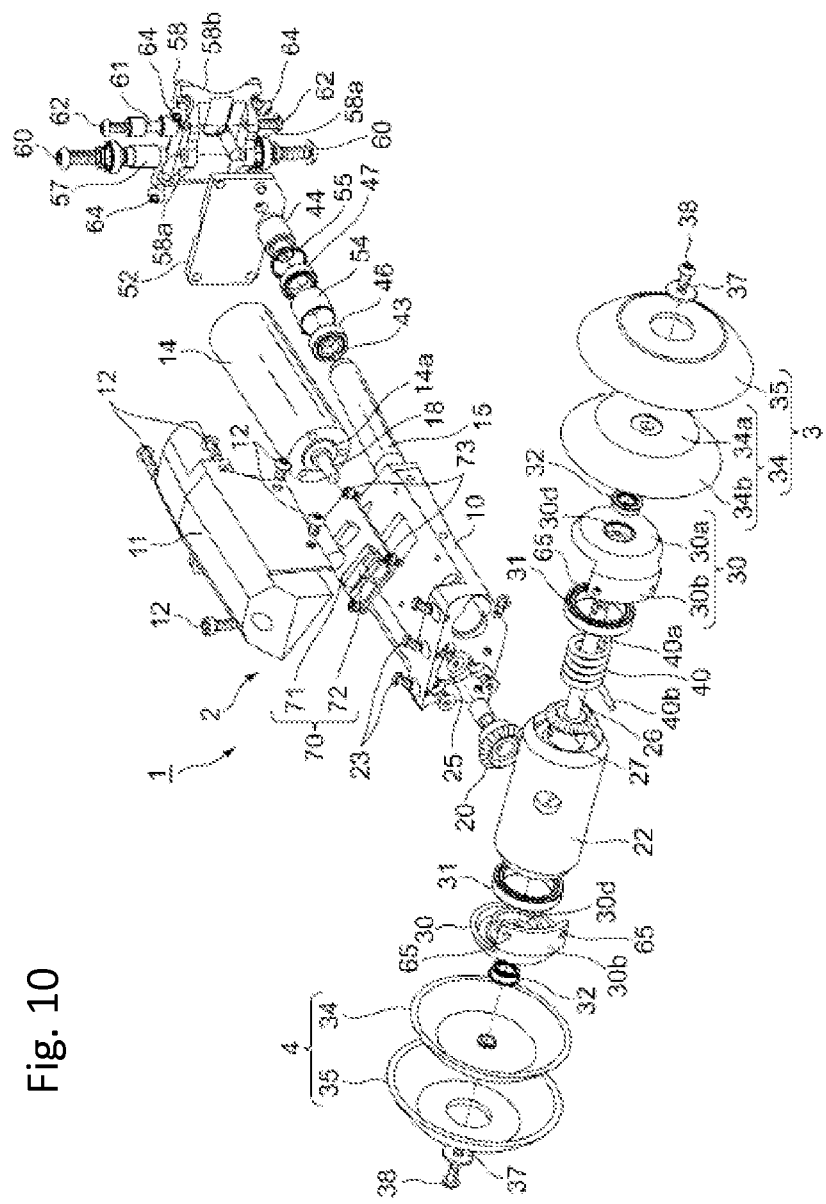
FIG. 10 is an exploded perspective view of the embodiment of the traveling module used in the in-pipe traveling apparatus according to the invention.
Figure 11A:
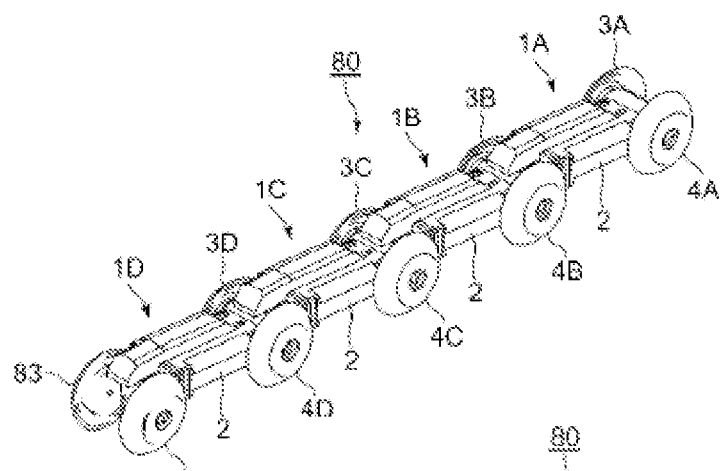
FIG. 11A is a perspective view.
Figure 11B:
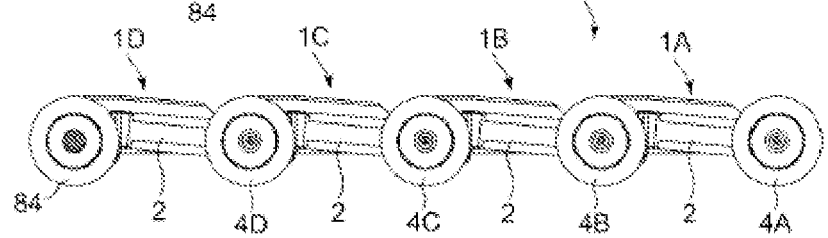
FIG. 11B is a front view.
Figure 11C:
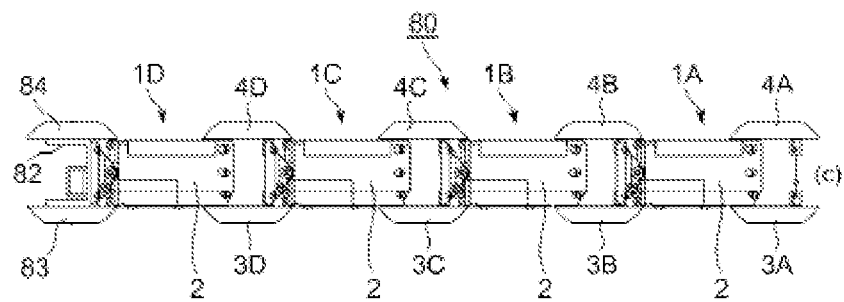
FIG. 11C is a plan view.
Figure 11D:
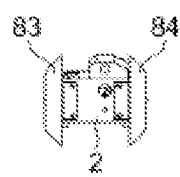
FIG. 11D is a right side view.
Figure 12A:
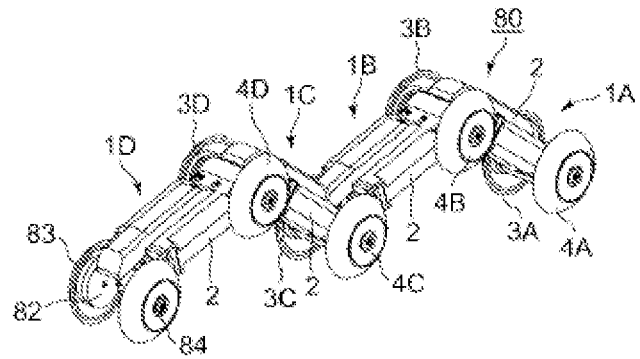
FIG. 12A is a perspective view.
Figure 12B:
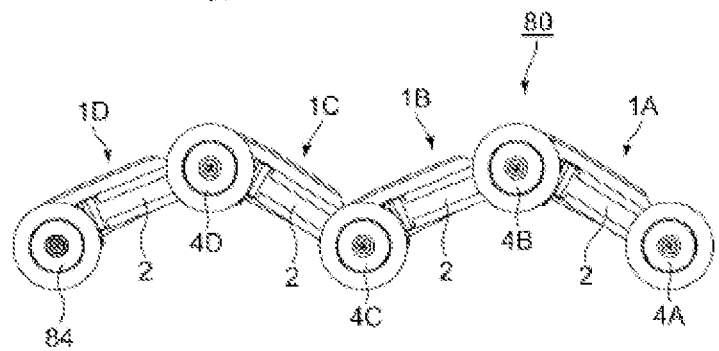
FIG. 12B is a front view.
Figure 12C:
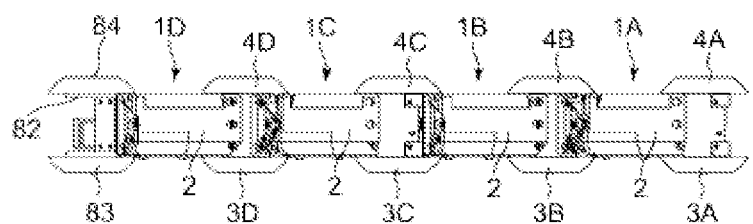
FIG. 12C is a plan view.
Figure 12D:
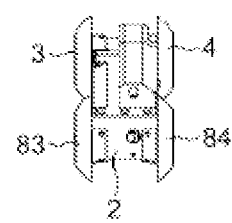
FIG. 12D is a right side view.

The traveling module body 2 is formed of a base member 10 and a cover member 11, and the cover member 11 is removably attached to the base member 10 with a plurality of attachment screws 12, as shown in FIG. 10 and other figures. The base member 10 is formed of a tubular member capable of holding a motor for travel operation 14, which forms the drive member 5, and a motor for swing operation 15, which forms the swing member 7, and the motor for travel operation 14 and the motor for swing operation 15 are disposed in parallel to each other and fixed to the base member 10. The base member 10 has a first end surface portion 10a, which closes one tube axial end of the base member 10, and a second end surface portion 10b, which closes part of the other tube axial end of the base member 10. A first fitting hole 17a, which is formed of a threaded hole, is provided through the first end surface portion 10a of the base member 10, and a second fitting hole 17b, which is formed of a threaded hole, is provided through the second end surface portion 10b of the base member 10.

The drive member 5, which drives the pair of traveling wheels 3, 4 in such a way that they rotate, includes the motor for travel operation 14 and a pair of bevel gears 20, 27. The motor for travel operation 14 has a rotary shaft 18, which protrudes from one side of a cylindrical motor body. An attachment seat 14a, the outer circumferential surface of which is threaded, is provided on the motor body at an end thereof on the side where the rotary shaft 18 is present. The attachment seat 14a is screwed into the first fitting hole 17a to fix the motor for travel operation 14 to the base member 10 with the rotary shaft 18 protruding through the fitting hole 17a. The drive-side bevel gear 20 is fixed to the rotary shaft 18 with a fixing screw 21 so that the rotary shaft 18 and the bevel gear 20 are rotatable as a unitary part.

Figure 6:
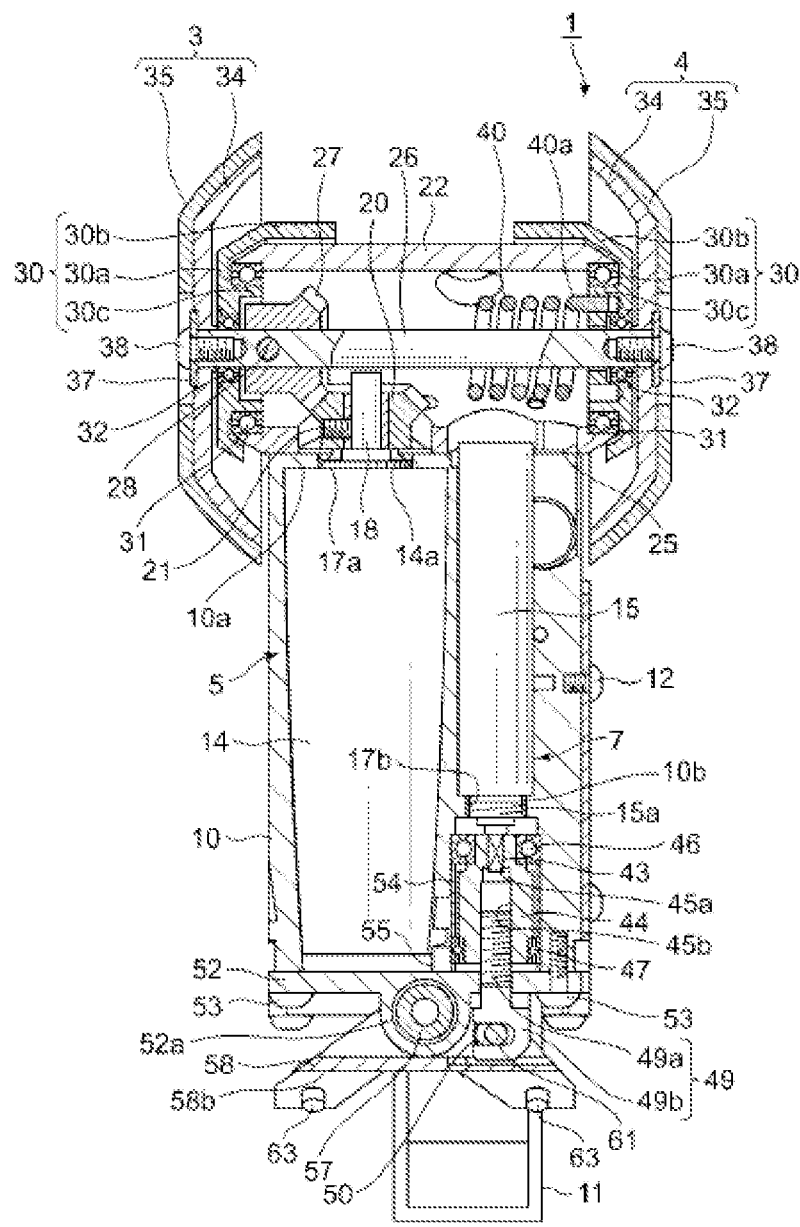
FIG. 6 is a cross-sectional view of the traveling module shown in FIG. 4 taken along the line X-X.
Figure 7:
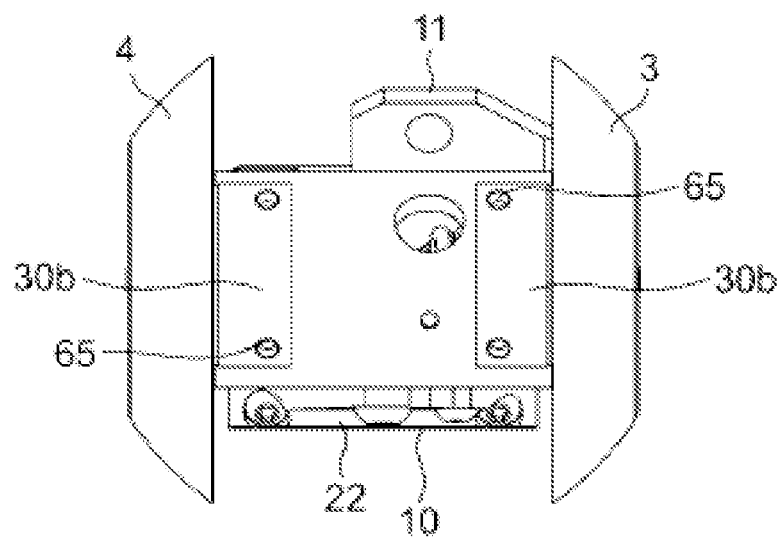
FIG. 7 is a right side view of the embodiment of the traveling module used in the in-pipe traveling apparatus according to the invention.
Figure 8:
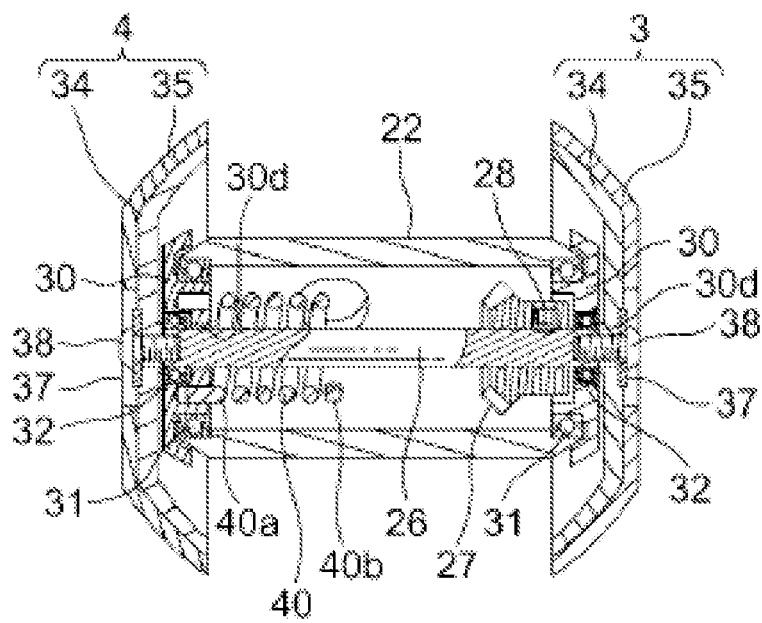
FIG. 8 is a cross-sectional view of the traveling module shown in FIG. 4 taken along the line Y-Y.
Figure 9:
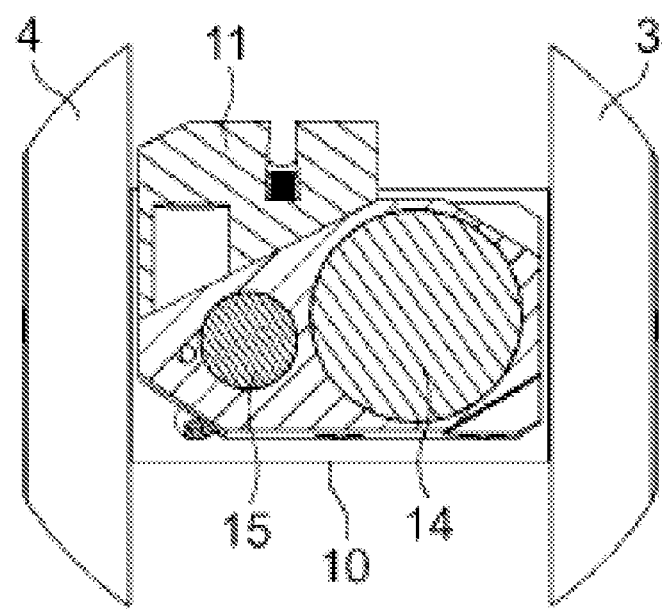
FIG. 9 is a cross-sectional view of the traveling module shown in FIG. 4 taken along the line Z-Z.

A cover barrel 22 is fixed to the outer surface of the first end surface portion 10a of the base member 10 with a plurality of fixing screws 23. The cover barrel 22 is formed of a cylindrical member that is open on both sides, and the cover barrel 22 has a fixing portion fixed to the first end surface portion 10a and having an opening 25, which allows the rotary shaft 18 and other components to pass through. A wheel shaft 26, which extends along the axial center line of the cover barrel 22, is disposed in the cover barrel 22, and the driven-side bevel gear 27 is fixed to the wheel shaft 26 with a fixing screw 28 so that the wheel shaft 26 and the bevel gear 27 are rotated as a unitary part, as shown in FIGS. 1, 6, and 8. The driven-side bevel gear 27 engages with the drive-side bevel gear 20, and the wheel shaft 26 is driven with the motor for travel operation 14 via the two bevel gears 20, 27 in such a way that the wheel shaft 26 rotates.

An end surface bracket 30, which is a first member, is disposed at an opening at each tube axial end of the cover barrel 22. Each of the end surface brackets 30 has a disc-shaped end surface portion 30a, which covers the corresponding opening of the cover barrel 22, an outer tubular portion 30b, which continuously extends from the outer circumferential edge of the end surface portion 30a and protrudes toward one side thereof, and an inner tubular portion 30c, which protrudes from a central portion of the end surface portion 30a toward the one side thereof, and a center hole 30d, which pass through the inner tubular portion 30c and the end surface portion 30a, is provided at the center thereof. Each of the pair of end surface brackets 30, is rotatably supported by an outer-circumference-side bearing 31 at the corresponding opening of the cover barrel 22. The outer ring of each of the outer-circumference-side bearings 31 is fit into the corresponding opening of the cover barrel 22, and the inner ring of each of the outer-circumference-side bearings 31 is fit with the outer circumference of the inner tubular portion 30c of the corresponding end surface bracket 30.

An inner-circumference-side bearing 32 is fit into the center hole 30d, which passes through the center of the inner tubular portion 30c of each of the end surface brackets 30. The outer ring of each of the inner-circumference-side bearings 32 is fit into the corresponding center hole 30d, and the wheel shaft 26 passes through the inner ring of each of the inner-circumference-side bearings 32. The wheel shaft is thus rotatably supported by the cover barrel 22 via the pair of end surface brackets 30, 30, whereby in the traveling module connected unit, in which the traveling modules 1 are interconnected in line, adjacent traveling modules 1 can swing in the vertical direction (pitching motion). Both ends of the wheel shaft 26 pass through the center holes 30d in the end surface brackets 30 and protrude out thereof, and the pair of traveling wheels 3, 4 are fixed to the protruding portions of the wheel shaft 26.

Each of the traveling wheels 3, 4 has a wheel body 34 and a power transmitting portion 35, which covers the outer surface of the wheel body 34, and the power transmitting portion 35 is integrated with the outer surface of the wheel body 34 via an adhesive or any other adhesion means, as shown in FIGS. 1, 6, 10, and other figures. The wheel body 34 has a disc-shaped end surface portion 34a and a contact surface portion 34b, which continuously extends from the outer circumferential edge of the end surface portion 34a outward in the radial direction and is inclined toward one side of the end surface portion 34a. The outer surfaces of the pair of contact surface portions 34b form a spherical surface so that they together form part of a sphere. Each of the power transmitting portions 35 is so formed that it continuously extends from the entire outer surface of the corresponding contact surface portion 34b to a portion in the vicinity of a central portion of the corresponding end surface portion 34a. Each of the power transmitting portions 35 transmits power generated by the motor for travel operation 14 via the wheel body 34 of the corresponding one of the traveling wheels 3, 4 to the inner surface of a pipe to produce a frictional force between the power transmission portion and the inner surface of the pipe, and the power transmitting portions 35 are made of a transmissible material having a large coefficient of friction and capable of transmitting power. The power transmitting portions 35 are preferably made, for example, of silicon rubber, butyl rubber, or any of a variety of other rubber materials but can instead be made of any of a variety of power transmissible materials.

Each of the pair of traveling wheels 3, 4 is removably fastened and fixed to the end surface of the wheel shaft 26 with an attachment screw 38 with a washer 37 interposed between the traveling wheel and the attachment screw. Further, between the pair of end surface brackets 30, 30, which close the openings on opposite sides of the cover barrel 22, is disposed a coil spring 40, which is a specific example of an elastic member that produces a spring force for zigzagging the traveling module connected unit, in which a plurality of traveling modules 1 are interconnected in line in the longitudinal direction of the traveling module connected unit, in the pitching direction (vertical direction provided that axial direction of wheel shaft 26 is defined to be horizontal direction).

Figure 13:
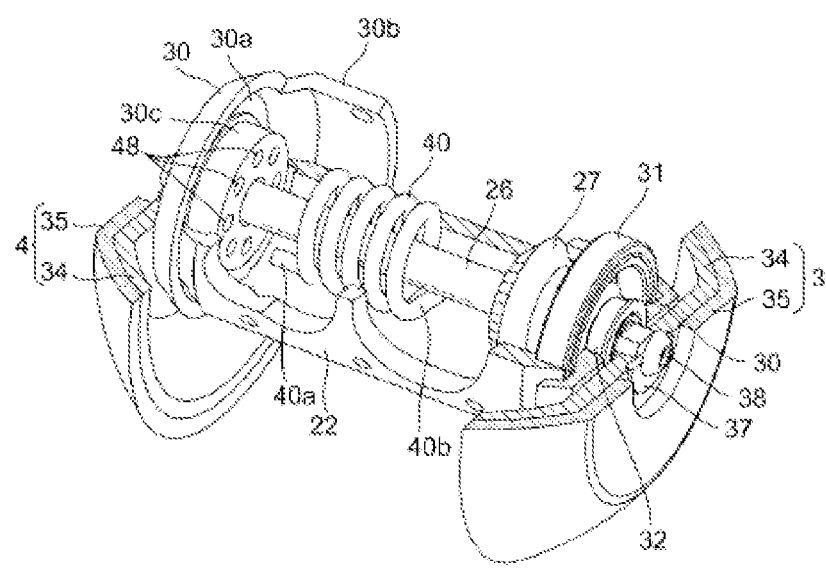
FIG. 13 shows an embodiment for achieving the contracted state of the traveling module connected unit shown in FIG. 12 and is a descriptive diagram for describing the relationship between a coil spring and a plurality of locking holes provided in an end surface bracket.
Figure 14A:
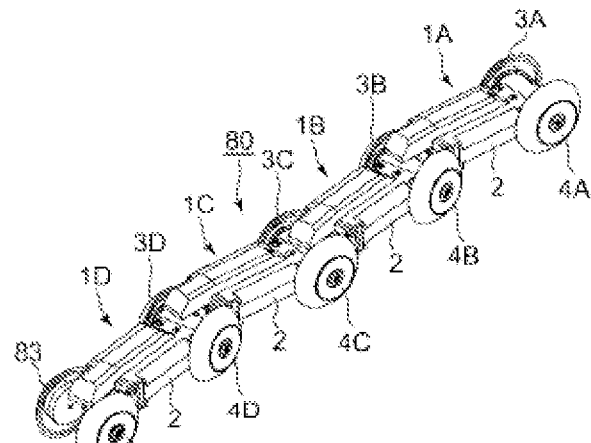
FIG. 14A is a perspective view.
Figure 14B:
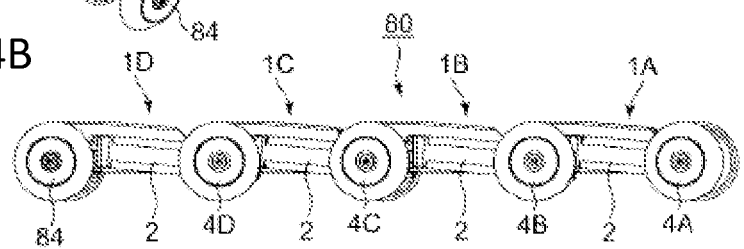
FIG. 14B is a front view.
Figure 14C:
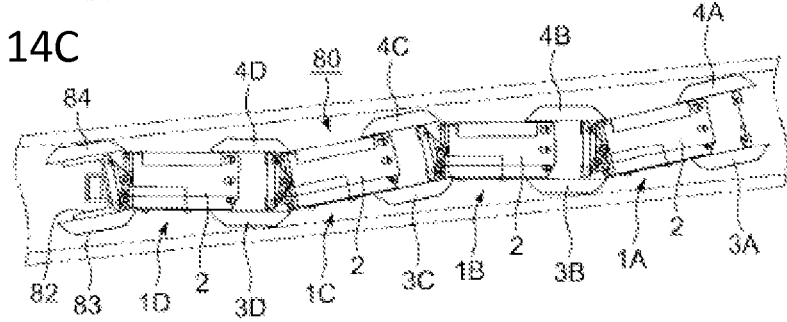
FIG. 14C is a plan view.
Figure 14D:
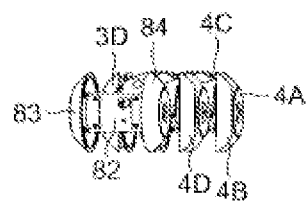
FIG. 14D is a right side view.

The wheel shaft 26 is so inserted into a central portion of the coil spring 40 that they are arranged concentrically with each other, and the coil spring 40 are so disposed that it faces the driven-side bevel gear 27. A fixed end 40a, which is one end of the coil spring 40, is hooked and fixed to one of a plurality of (eight in present embodiment) locking holes 48 provided in the inner tubular portion 30c of the corresponding end surface bracket 30, as shown in FIG. 13. Changing the locking hole 48 to which the fixed end 40a of the coil spring 40 is hooked and fixed to another locking hole 48 allows the magnitude of the spring force produced when the coil spring 40 is twisted and the direction in which the spring force acts (clockwise or counterclockwise) to be changed. The magnitude of the spring force produced by the coil spring 40 and the direction in which the spring force acts will be described later in detail.

A free end 40b, which is the other end of the coil spring 40, extends in the tangential direction to the coil spring 40, is inserted into a through hole provided in the cover barrel 22, and passes through the through hole and protrudes out of the outer circumferential surface of the cover barrel 22. In operation, the coil spring 40 is twisted at the fixed end 40a in the tangential direction, and the produced spring force is used. That is, setting the directions of the spring forces produced by the coil springs 40 in adjacent traveling modules 1 to alternate in opposite directions allows a plurality of traveling modules 1 to be oriented alternately upward and downward. The alternate upward and downward orientation will be described later in detail with reference to FIGS. 11 to 13.

When the motor for travel operation 14 described above is driven, the pair of traveling wheels 3, 4 are so driven that they rotate at the same speed in the same direction. That is, when the motor for travel operation 14 is driven, the drive force therefrom is transmitted from the rotary shaft 18 via the drive-side bevel gear 20 to the driven-side bevel gear 27. As a result, the pair of traveling wheels 3, 4 fixed to the opposite ends of the wheel shaft 26 are driven via the wheel shaft 26, which is integrated with the driven-side bevel gear 27 in the direction of rotation, in such a way that the pair of traveling wheels 3, 4 rotate at the same speed in the same direction (forward rotation or backward rotation).

The motor for swing operation 15, which forms the swing member 7, causes adjacent traveling modules 1 in the traveling module main body, in which the traveling modules 1 are interconnected in line, to swing in the horizontal direction (yawing motion), and a rotary shaft 43 protrudes from one side of a cylindrical motor body, as shown in FIGS. 1 and 6 and other figures. An attachment seat 15a, the outer circumferential surface of which is threaded, is provided on the motor body of the motor for swing operation 15 at an end thereof on the side where the rotary shaft 43 is present. The attachment seat 15a is screwed into the second fitting hole 17b with the rotary shaft 43 protruding in the direction opposite to the direction in which the rotary shaft of the motor for travel operation 14 protrudes, so that the motor for swing operation 15 is so disposed that the rotary shaft 43 protrudes in the direction away from the pair of traveling wheels 3, 4. A nut member 44 is connected to the rotary shaft 43 of the motor for swing operation 15 in such a way that the rotary shaft and the nut member rotate as a unitary part.

The nut member 44 is formed of a ring-shaped member having a hole passing through an axially central portion thereof with one axial side of the hole forming a rectangular hole 45a having a rectangular cross-sectional shape and the other axial side of the hole provided with a threaded portion 45b. The protruding portion of the rotary shaft 43 has a rectangular columnar shape, and fitting the rotary shaft 43 into the rectangular hole 45a allows the nut member 44 to rotate integrally with the rotary shaft 43. An inner bearing and an outer bearing 47 are attached to the axially opposite ends of the nut member 44, and the nut member 44 is so supported by the two bearings 46, 47 that the nut member is rotatable relative to the base member 10.

A threaded shaft 49a of an advancing/retracting rod 49 is screwed into the threaded portion 45b of the nut member 44. The advancing/retracting rod 49 has an effector 49b, which continuously extends from one axial side of the threaded shaft 49a. The effector 49b has a cutout groove 50, which is open in a direction that intersects the axial direction of the threaded shaft 49a.

An attachment plate 52 is disposed on the side the base member 10 that is opposite to the side thereof where the pair of traveling wheels 3, 4 are disposed, and the attachment plate 52 is removably fastened and fixed to the base member with a plurality of attachment screws 53, as shown in FIGS. 1, 6, and other figures. In FIG. 6 and other figures, reference character 54 denotes a sleeve interposed between the inner bearing 46 and the outer bearing 47, and reference character 55 denotes a sleeve interposed between the outer bearing 47 and the attachment plate 52.

The attachment plate 52 is formed of a flat-plate-shaped member having a substantially rectangular shape, and in a longitudinally central portion on one side of the attachment plate 52, a shaft receiving portion 52a, which has an insertion hole extending in a direction that intersects the longitudinal direction of the attachment plate 52, is provided, as shown in FIG. 10. A pivotal shaft 57 is rotatably inserted into the insertion hole in the shaft receiving portion 52a. A swingable bracket 58 is swingably attached to the attachment plate 52 via the pivotal shaft 57. The swingable bracket 58, which is a second member, has a pair of shaft receiving pieces 58a on one side and has a recess 58b, which engages with the cover barrel 22, on the other side.

The pair of shaft receiving pieces 58a, 58a of the swingable bracket 58 face each other in such a way that they extend in the longitudinal direction of the swingable bracket 58 with a predetermined gap therebetween in a direction that intersects the longitudinal direction. The pivotal shaft 57, which is interposed between the pair of shaft receiving pieces 58a, 58a, is attached to the swingable bracket 58 with attachment screws 60 from opposite outer sides in the axial direction of the pivotal shaft 57. Further, a swing pin 61 is disposed between the pair of shaft receiving pieces 58a, 58a in such a way that the swing pin 61 is set apart from and in parallel to the pivotal shaft 57 disposed in a substantially central portion in the longitudinal direction of the shaft receiving pieces 58a, 58a. The swing pin 61 is fixed to the swingable bracket 58 with attachment screws 62 from opposite outer sides in the axial direction of the swing pin 61. The cutout groove 50 provided in the effector 49b of the advancing/retracting rod 49 engages with the swing pin 61 in such a way that the swing pin 61 is slidable along the cutout groove 50. The threaded shaft 49a of the advancing/retracting rod 49 is screwed into the threaded portion 45b of the nut member 44, and the rotary shaft 43 of the motor for swing operation 15 engages with the rectangular hole 45a in the nut member 44.

When the motor for swing operation 15 described above is driven, the swingable bracket 58 is swung in the horizontal direction relative to the attachment bracket 52 fixed to the base member 10 (yawing motion). That is, when the rotary shaft of the motor for swing operation 15 is rotated in one direction, the torque therefrom is transmitted via the rotary shaft 18 to the nut member 44 and further transmitted from the nut member 44 to the advancing/retracting rod 49. At this point, the advancing/retracting rod 49 moves forward or backward in accordance with the direction of rotation of the nut member that corresponds to the direction of rotation of the rotary shaft of the motor for swing operation 15. When the advancing/retracting rod 49 moves forward (in the direction in which the advancing/retracting rod 49 protrudes outward) as a result of the rotation, the swingable bracket 58 pivots clockwise in FIG. 6. Conversely, when the advancing/retracting rod 49 moves backward (in the direction in which the advancing/retracting rod 49 retracts inward) as a result of the rotation, the swingable bracket 58 pivots counterclockwise in FIG. 6.

The recess 58b of the swingable bracket 58 is so formed that it has a curved shape that conforms to the outer surface of the cover barrel 22, as shown in FIGS. 1, 6, and 10. Further, a plurality of protrusions 63 for positioning the pair of end surface brackets 30, 30 are provided on the recess 58b of the swingable bracket 58. In correspondence with the protrusions 63, positioning holes 65, the number of which is equal to the number of protrusions 63, are provided in the pair of end surface brackets 30, 30. The plurality of protrusions 63 are allowed to engage with the positioning holes 65, and the swingable bracket 58 is fastened to the pair of end surface brackets 30, 30 with attachment screws 64, whereby traveling modules 1 disposed in adjacent positions are so interconnected that they are allowed to make pitching motion.

A drive controller 70 for controlling the action of the traveling module 1 is attached to the upper surface of the base member 10, as shown in FIG. 10. The drive controller 70 includes a wiring substrate 71, on which a wiring pattern having a predetermined shape is provided, and electronic parts 72, such as a microcomputer, LSIs, capacitors, and resisters, which are mounted on the wiring substrate 71. The drive controller 70 is fastened and fixed to the base member with a plurality of attachment screws 73. The cover member 11 is so mounted on the upper surface of the base member 10 that the cover member 11 entirely covers the drive controller 70 and fastened and fixed to the base member 10 with a plurality of the attachment screws 12.

Four traveling modules 1 each having the configuration described above are interconnected in line in the longitudinal direction of the traveling modules to configure a traveling module connected unit 80 formed of four traveling modules 1A, 1B, 1C, and 1D according to an embodiment of the invention. FIG. 11 shows a straight state in which the center line of the traveling module connected unit 80 extends straight in a linear state in the traveling direction. FIG. 12 shows a pitching state of the traveling module connected unit 80 (upward/downward serpentine state in which the traveling module connected unit 80 is zigzagged in the direction perpendicular to the surface on which the traveling module connected unit 80 is placed). Further, FIG. 14 shows a yawing state of the traveling module connected unit 80 (rightward/leftward serpentine state in which the traveling module connected unit 80 is zigzagged in the horizontal direction parallel to the surface on which the traveling module connected unit 80 is placed).

The traveling module connected unit 80 is so configured that the four traveling modules 1A to 1D are arranged in line in the longitudinal direction thereof and the swingable bracket 58 of each of the traveling modules 1 is fastened to the pair of end surface brackets 30, 30 of an adjacent traveling module 1 with screws. That is, the recess 58b of the swingable bracket 58 of the first traveling module 1A (the same holds true for the second to fourth traveling modules 1B to 1D) is caused to come into contact with the outer tubular portions 30b of the pair of end surface brackets 30, 30 disposed on the tube axial opposite sides of the cover barrel 22 of the second traveling module 1B. In this process, the plurality of protrusions 63 provided on the swingable bracket 58 are fit into the positioning holes 65 provided in the pair of end surface brackets 30, 30 for positioning of the swingable bracket 58. A plurality of attachment screws 64 are then fastened to fix the swingable bracket 58 to the pair of end surface brackets 30, 30.

The four traveling modules 1 are thus so interconnected in line that they are swingable not only in the pitching direction (vertical direction with respect to surface on which traveling module connected unit is placed) but also in the yawing direction (horizontal direction with respect to surface on which traveling module connected unit is placed), as shown in FIGS. 11A to 11D. Further, a wheel bracket 82 is attached to the fourth traveling module 1D, specifically, the swingable bracket 58 disposed on the side facing away from the pair of traveling wheels 3, 4 with attachment screws or any other fasteners, as shown in FIGS. 11, 12, and 14. The wheel bracket 82 is formed of a support member having a U-like cross-sectional shape, and a pair of idler wheels 83, are rotatably attached to support portions on opposite ends of the wheel bracket 82. The traveling module connected unit 80 formed not only of the four traveling modules 1A to 1D but also of the pair of idler wheels 83, 84 is thus formed.

The traveling module connected unit 80 shown in FIG. 11 shows a state in which the four traveling modules 1A to 1D are simply interconnected in line and is not actually capable of traveling because no effect of the spring force of each of the coil springs 40 is considered in FIG. 11. After three coil springs 40 in the traveling module connected unit 80 are so twisted that the spring force of each of the coil springs acts in a predetermined direction, the traveling module connected unit 80 is alternately bent in opposite pitching directions and capable of traveling, as shown in FIGS. 12A to 12D.

That is, in the states shown in FIGS. 11A to 11D, at the first link (portion where first traveling module 1A is connected to second traveling module 1B), the fixed end 40a of the coil spring 40 in the second traveling module 1B is twisted clockwise by a predetermined angle (for example, 30, 60, and 90 degrees, the angle can be arbitrarily set), and the fixed end 40a is hooked to the locking hole 48 facing the fixed end 40a or the locking hole 48 closest thereto, as shown in FIG. 13. As a result, the two traveling modules 1A, 1B on opposite sides of the first link protrude convexly upward, whereby the two traveling modules 1A, 1B are interconnected in an inverse V-like shape.

At the second link (portion where second traveling module 1B is connected to third traveling module 1C), the fixed end 40a of the coil spring 40 in the third traveling module 1C is twisted by the predetermined angle (such as 30, 60, and 90 degrees) counterclockwise or in the opposite direction to the direction at the first link, and the fixed end 40a is hooked to the locking hole 48 facing the fixed end 40a or the locking hole 48 closest thereto. As a result, the two traveling modules 1B, 1C on opposite sides of the second link protrude convexly downward, or the two traveling modules 1B, 1C are interconnected in a V-like shape.

Further, at the third link (portion where third traveling module 1C is connected to fourth traveling module 1D), the fixed end 40a of the coil spring 40 in the fourth traveling module 1D is twisted by the predetermined angle (such as 30, 60, and 90 degrees) clockwise or in the same direction as the direction at the first link, and the fixed end 40a is hooked to the locking hole 48 facing the fixed end 40a or the locking hole 48 closest thereto. As a result, the two traveling modules 1C, 1D on opposite sides of the third link protrude convexly upward, or the two traveling modules 1C, 1D are interconnected in the inverse V-like shape. The magnitude of the spring force of each of the coil springs 40 can be changed by changing the position of the fixed end 40a with respect to the plurality of locking holes 48, that is, the amount of twist of the coil spring 40. When the magnitude of the spring force is increased, the height of the traveling module connected unit 80 increases, whereas when the magnitude of the spring force is decreased, the height of the traveling module connected unit 80 decreases.

Since no adjacent traveling module is present on the opposite side of the first traveling module 1A to the second traveling module 1B, the fixed end 40a of the coil spring 40 in the first traveling module 1A is allowed to be released free. The drive member 5 is formed, for example, of the motor for travel operation 14 and the pair of bevel gears 20, described above. Further, the connection member 6 is formed, for example, of the pair of end surface brackets 30, 30, the pivotal shaft 57, and the swingable bracket 58. Moreover, the swing member 7 is formed, for example, of the motor for swing operation 15, the nut member 44, and the advancing/retracting rod 49.

As described above, the coil springs 40 in the three second to fourth traveling modules 1B to 1D are twisted in alternately different directions so that every other preload is set in the same direction and the other preloads are set in the opposite direction for generation of an overall spring force in a predetermined direction, whereby the traveling module connected unit 80 in which the four traveling modules 1A to 1D are interconnected and oriented alternately upward and downward can be formed, as shown in FIGS. 12A to 12D.

FIGS. 14A to 14D describe how the traveling module connected unit 80 in the yawing state (rightward/leftward serpentine state in which traveling module connected unit 80 travels along horizontally serpentine path) travels. The traveling module connected unit 80 shown in FIGS. 14A to 14D shows a state in which the four traveling modules 1A to 1D are simply interconnected in line and is not actually capable of serpentine traveling because no effect of the spring force of each of the coil springs 40 is considered.

Figure 24:
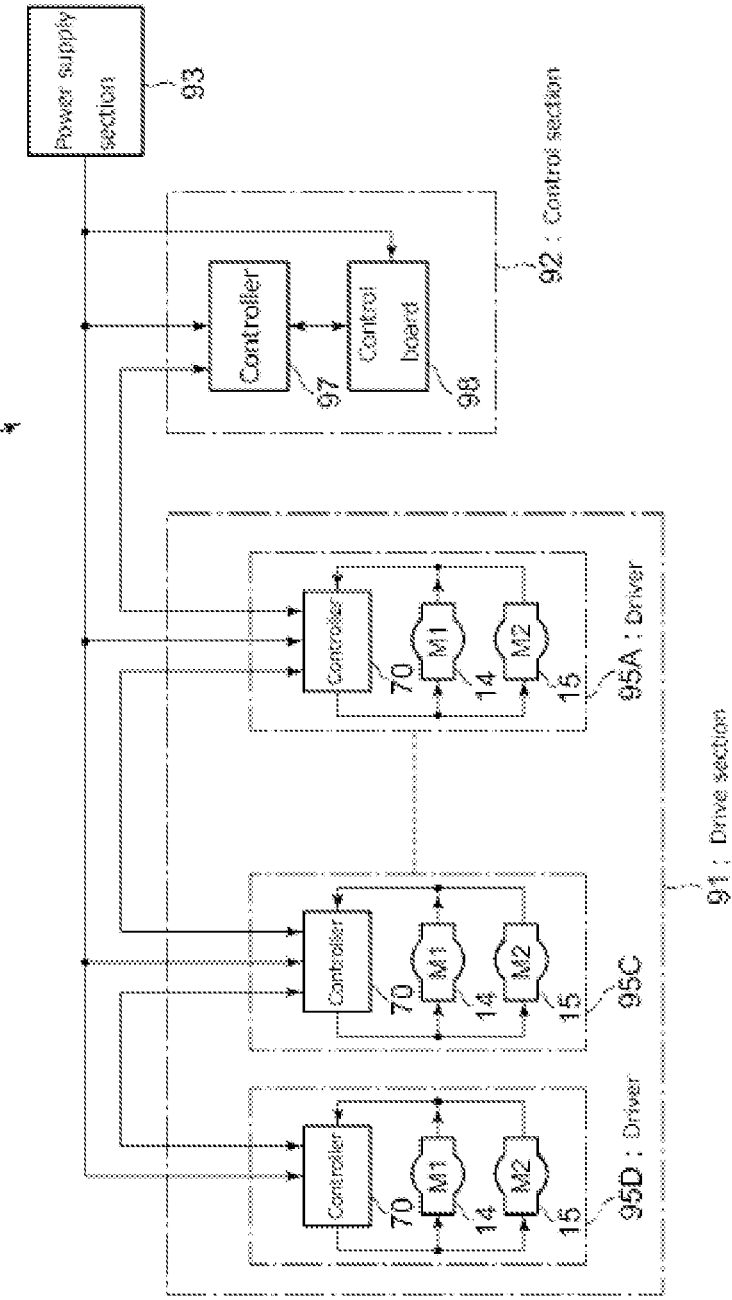
FIG. 24 is a schematic descriptive diagram showing an example of a control unit in the traveling module connected unit according to the embodiment of the in-pipe traveling apparatus of the invention.

FIG. 24 is a block diagram showing an example of a control unit for controlling the action of the traveling module connected unit 80 having the configuration described above. The control unit 90 includes a drive section 91, a control section 92, and a power supply section 83.

The drive section 91 has four drivers 95A to 95D incorporated in the four traveling modules 1A to 1D, respectively. Each of the drivers 95A to 95D is formed, for example, of the controller 70 for drive purposes, the motor for travel operation 14, and the motor for swing operation described above. The control section 92 includes a controller 97 for control purposes, a control board 98, and other components. The controller 97 controls the four controllers 70 in the drive section 91 and includes a microcomputer, LSIs, and other electronic parts. The controller 97 is incorporated in the control board 98, which further includes a power switch that makes and breaks connection with a power supply, an operation switch that controls the action of the motor for swing operation 15, and other components. The power supply section 93 may be a portable power supply, such as a battery and a generator, or may be a power supply in a factory, a household, and other places.

In the traveling module connected unit described in PTL1 (hereinafter referred to as "traveling module connected unit of related art"), it is necessary to connect a drive section incorporating vehicle to the rear of the traveling module connected unit. Among the components in the control unit, the drive section is incorporated in the drive section incorporating vehicle. No drive section can be incorporated in the traveling module of related art because no space in which a drive section is incorporated can be provided in the traveling module.

In the traveling module connected unit according to the invention, the drive section can be incorporated therein because the traveling module connected unit according to the invention has no cable unlike the traveling module connected unit of related art, and a space in which the drive section is incorporated can therefore be provided. As a result, the traveling module connected unit according to the invention is advantageous in that no drive section incorporating vehicle needs to be connected unlike the traveling module connected unit of related art.

Figure 15:
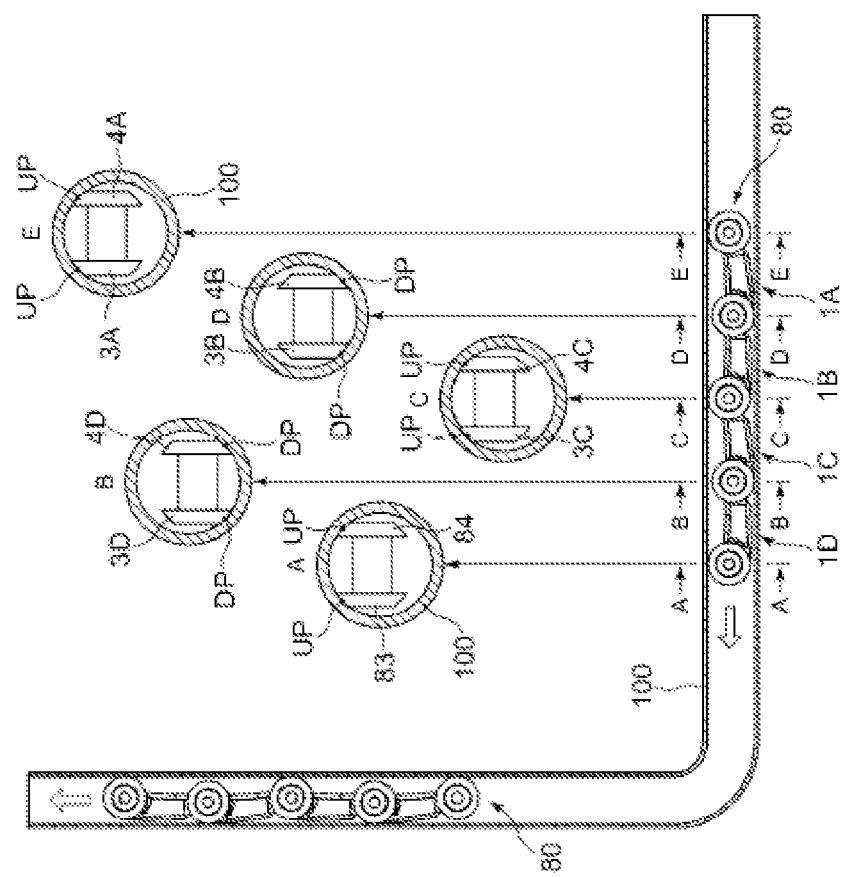

A description will next be made of how the traveling module connected unit 80 travels. FIG. 15 describes a state in which the traveling module connected unit 80 travels straight through a pipe 100 having a circular cross-sectional shape. In the embodiment, the traveling module connected unit 80 is so inserted into the pipe 100 that the pair of idler wheels 83, 84 provided in the fourth traveling module 1D are first inserted, followed by the third to first traveling modules, and the traveling module connected unit 80 travels through the pipe 100 with the idler wheels 83, 84 being the leading end. The traveling module connected unit 80 may instead, of course, be so inserted into the pipe 100 that the first traveling module 1A is first inserted into the pipe 100, followed by the second to fourth traveling modules, and the traveling module connected unit 80 may travel through the pipe 100 with the traveling wheels 3A, 4A of the first traveling module 1A being the leading end.

As shown in FIG. 15, since the four traveling modules 1A to 1D in the traveling module connected unit 80 are oriented alternately in different directions or zigzagged, the leading or first pair of idler wheels 83, 84, the third pair of traveling wheels 3C, 4C, and the last pair of traveling wheels 3A, 4A are in contact with one side of the inner surface of the pipe (upper surface in the embodiment shown in FIG. 15) at upper contact points UP, and the second pair of traveling wheels 3D, 4D and the fourth pair of traveling wheels 3B, 4B are in contact with the other side of the inner surface of the pipe (lower surface in the embodiment shown in FIG. 15) at lower contact points DP. At this point, the four pairs of right and left traveling wheels 3A to 3D and 4A to 4D are so driven that they rotate under the same contact pressure with the same torque, whereby the traveling module connected unit 80 in the linear state travels straight without pivotal motion.

Figure 16:
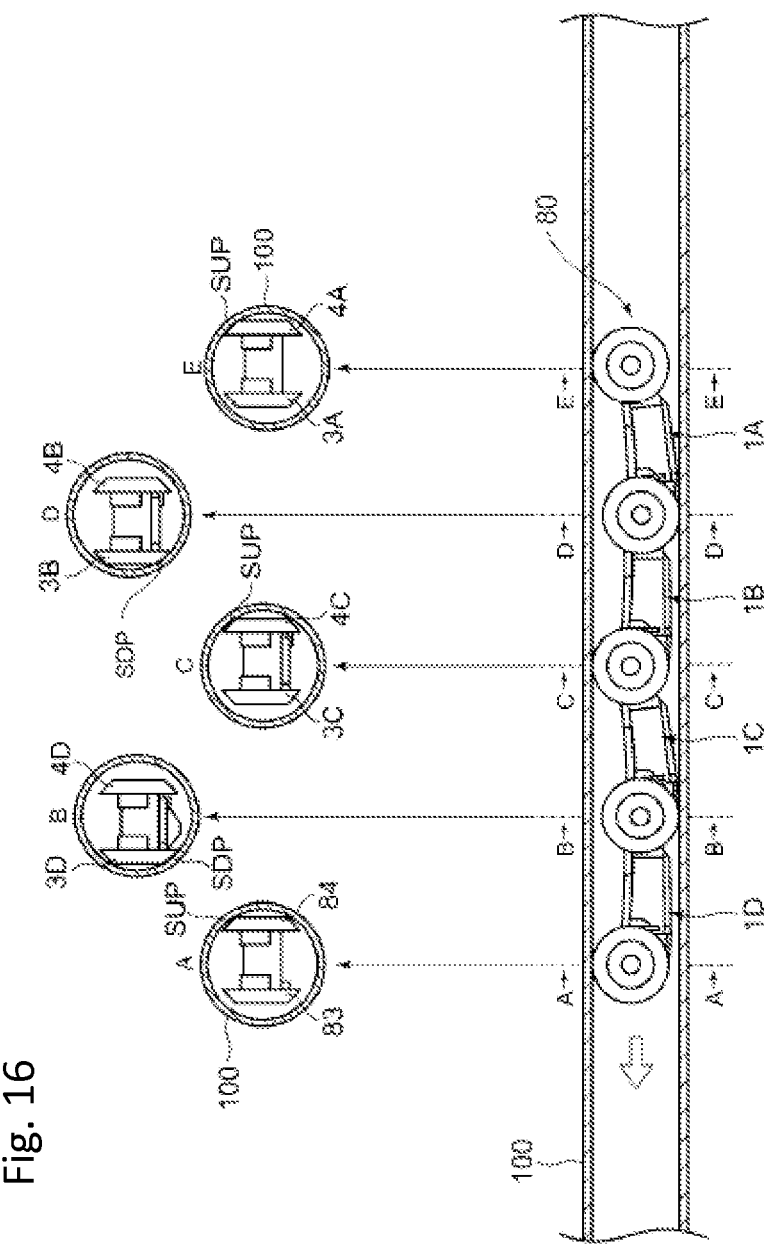
Figure 17:
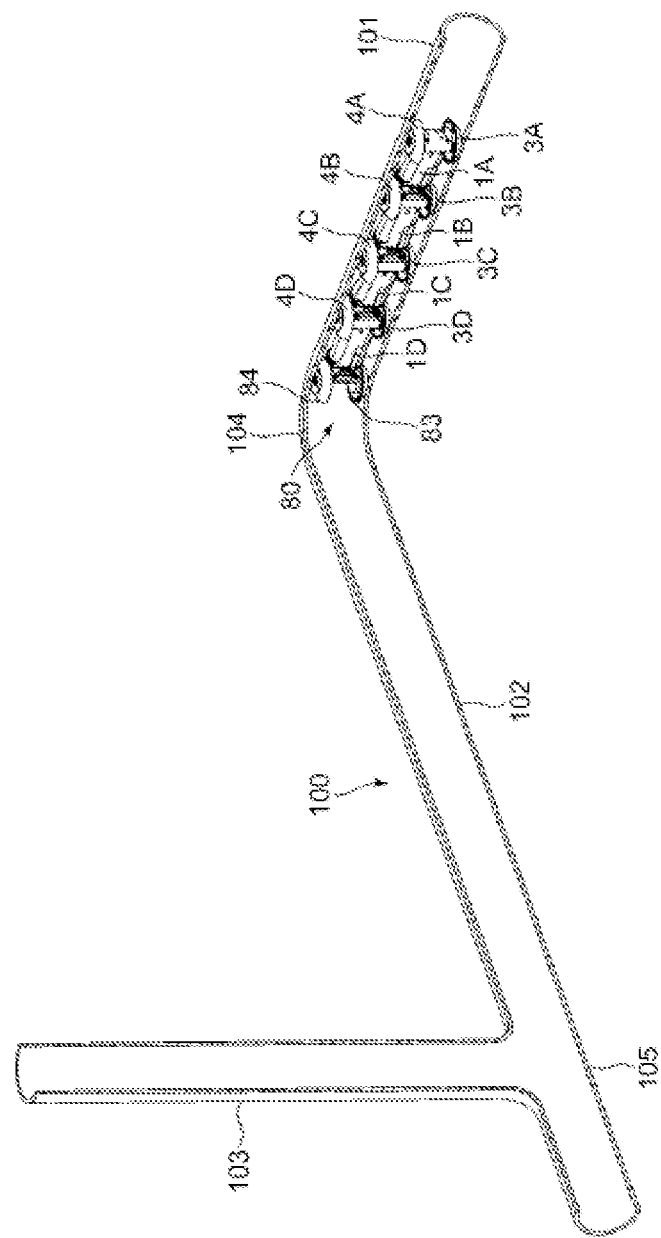
FIG. 17 describes how the traveling module connected unit according to the embodiment of the in-pipe traveling apparatus of the invention operates and specifically describes a state in which the traveling module connected unit is located in one of intermediate linear segments that form an L-shaped pipe.

FIG. 16 shows a state in which a force in the yawing direction is applied to the traveling module connected unit to cause it travel through the pipe 100. The force in the yawing direction can be applied by operating the motor for swing operation 15, which forms the swing member 7, to cause the swingable bracket 58 to pivot in the horizontal direction with respect to the surface on which the traveling module connected unit is placed. In the state shown in FIG. 16, only the leading or first right idler wheel 84, the third right traveling wheel 4C, and the fifth right traveling wheel 4A are in contact with an oblique upper surface of the pipe at oblique upper contact points SUP, and only the second left traveling wheel 3D and the fourth left traveling wheel 3B are in contact with an oblique lower surface of the pipe at oblique lower contact points SDP. At this point, the traveling module connected unit 80 travels forward in the traveling direction through the pipe 100 while pivoting therein.

FIGS. 17 to 23 describe how the traveling module connected unit 80 is caused to travel through a pipe 100 having an L-shaped horizontal segment extending in the horizontal direction and a vertical segment continuously extending from one side of the horizontal segment in the direction perpendicular thereto. The pipe 100 has an introduction segment 101, which forms one portion of the horizontal segment, an intermediate segment 102, which extends in a direction perpendicular to the introduction segment 101, and a vertical segment 103, which continuously extends in the vertical direction from a point located midway along the intermediate segment 102. The portion where the introduction segment 101 and the intermediate segment 102 intersect each other forms a curved segment 104 having a radius of curvature that allows the traveling module connected unit 80 to pass through the curved segment 104. The portion where the intermediate segment 102 and the vertical segment 103 intersect each other forms a T-shaped segment 105 having a radius of curvature that allows the traveling module connected unit 80 to pass through the T-shaped segment 105.

After the traveling module connected unit 80 is inserted into the introduction segment 101 of the pipe 100 and the control section 92 in the control unit 90 is operated to activate the traveling module connected unit 80, the traveling module connected unit 80 in the linear state travels or moves straight until it reaches the curved segment where the introduction segment 101 and the intermediate segment 102 intersect each other. Having reached the curved segment 104, which curves in the horizontal plane, the traveling module connected unit 80 can be deformed or curved in accordance with the curving direction. The traveling module connected unit 80 can thus pass through the curved segment 104 with the attitude thereof maintained, as shown in FIGS. 18A to 18C and 19A to 19C.

Figure 18A:
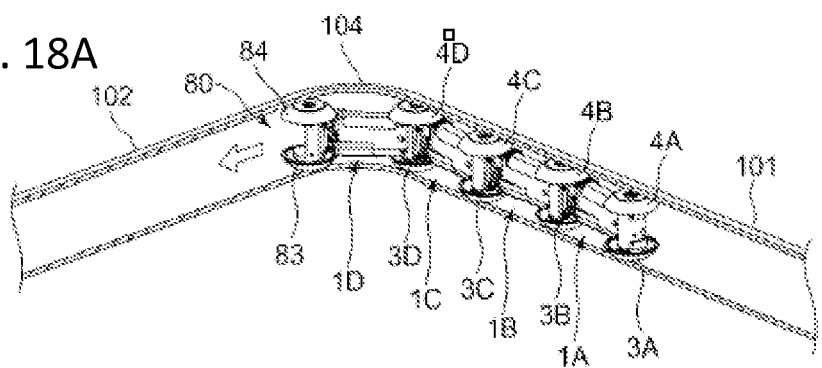
FIG. 18A is a descriptive diagram showing a state in which the first traveling wheels have moved to the other intermediate linear segment of the L-shaped pipe.
Figure 18B:
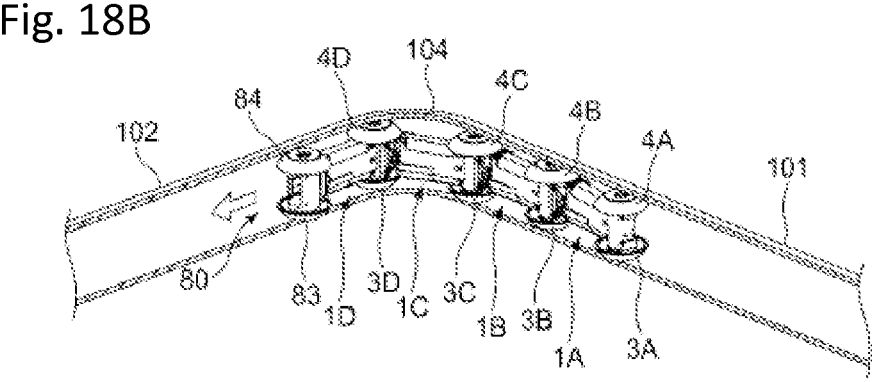
FIG. 18B is a descriptive diagram showing a state in which the second traveling wheels have moved to the other intermediate linear segment of the L-shaped pipe.
Figure 18C:
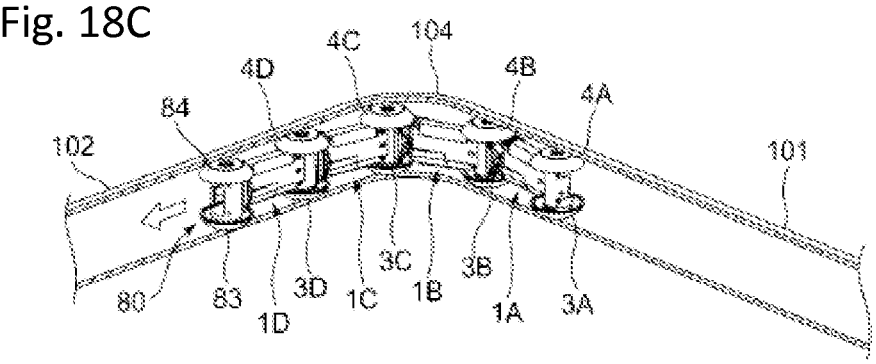
FIG. 18C is a descriptive diagram showing a state in which the third traveling wheels have moved to the other intermediate linear segment of the L-shaped pipe.
Figure 19A:
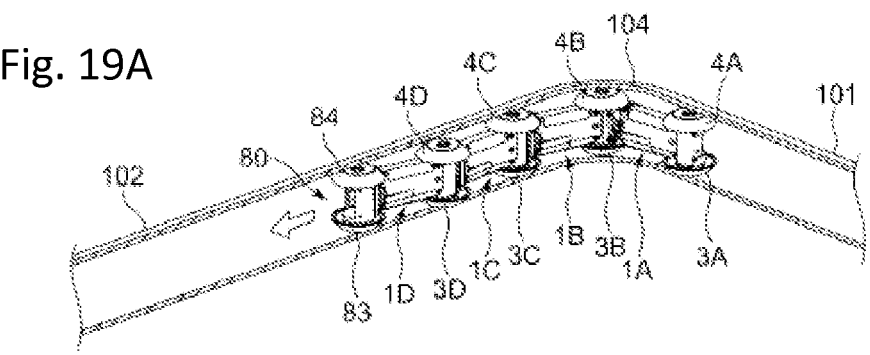
FIG. 19A is a descriptive diagram showing a state in which the fourth traveling wheels have moved to a bent portion of the L-shaped pipe.
Figure 19B:
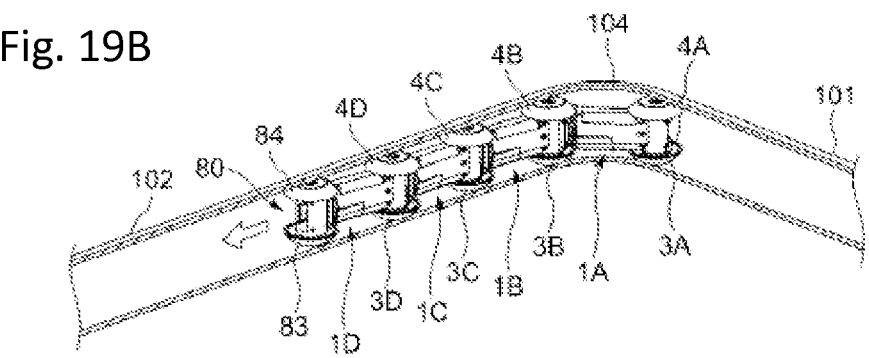
FIG. 19B is a descriptive diagram showing a state in which the fourth traveling wheels have moved to the other intermediate linear segment of the L-shaped pipe.
Figure 19C:
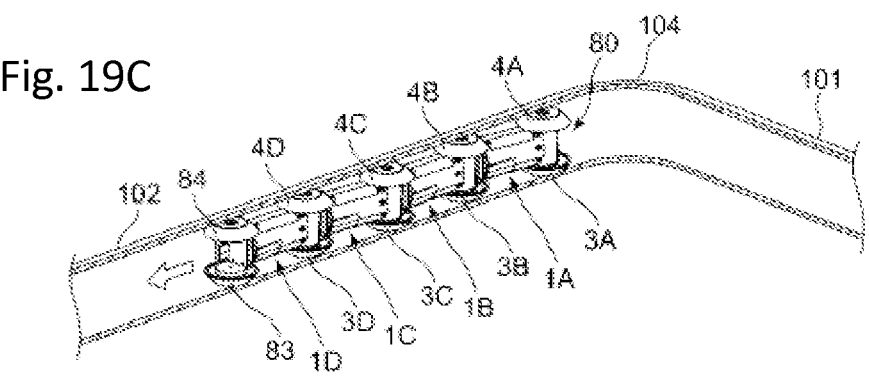
FIG. 19C is a descriptive diagram showing a state in which the fifth traveling wheels have moved to the other intermediate linear segment of the L-shaped pipe.

That is, in the traveling module connected unit 80, the pair of idler wheels 83, 84 of the leading traveling module 1D first pass through the curved segment 104, as shown in FIG. 18A. The pair of traveling wheels 3D, 4D of the same traveling module 1D next pass through the curved segment 104, as shown in FIG. 18B. The pair of traveling wheels 3C, 4C of the traveling module 1C in the second position then pass through the curved segment 104, as shown in FIG. 18C. Further, the traveling module 1B located in the third position undergoes the state shown in FIG. 19A and passes through the curved segment 104, as shown in FIG. 19B. Finally, the pair of traveling wheels 3A, 4A of the traveling module 1A in the fourth position similarly pass through the curved segment 104, as shown in FIG. 19C.

Thereafter, to cause the traveling module connected unit 80 in the linear state to move straight along the intermediate segment 102 of the pipe 100, the attitude of the traveling module connected unit 80 is maintained the same as the attitude at the point when the traveling module connected unit 80 has moved to the intermediate segment 102, and the same action of the drive member 5 allows the traveling module connected unit 80 to travel as desired. On the other hand, to cause the traveling module connected unit 80 to move along the intermediate segment 102 and enter the vertical segment 103, the traveling module connected unit 80 needs to pivot by 90 degrees. In the state in which the traveling module connected unit 80 has moved to the intermediate segment 102, the vertical segment extends in the vertical direction perpendicularly to the intermediate segment 102, which extends in the horizontal direction. Therefore, since the axial direction of the wheel shafts 26 of the four traveling modules 1A to 1D coincides with the direction in which the vertical segment 103 extends, the traveling module connected unit 80 cannot be curved in the direction in which the vertical segment 103 extends.

To allow the traveling module connected unit 80 to enter the vertical segment 103, the swing member 7 is activated to cause the traveling module connected unit 80 to pivot by 90 degrees. To allow the traveling module connected unit 80 to pivot, an operator who operates the control section 92 manually operates an operation switch (not shown) associated with the swing member 7.

To allow the traveling module connected unit 80 to pivot, a predetermined distance is required. The pivotal motion is therefore initiated in a position upstream of the T-shaped segment 105 by the predetermined distance. In the embodiment, the pivotal motion of the traveling module connected unit 80 is initiated in the position shown in FIG. 19C. The pivotal motion is achieved by operating the motor for swing operation 15, which forms the swing member 7, to cause the traveling module connected unit 80 to be zigzagged in a plane parallel to the surface on which the traveling module connected unit is placed.

That is, in the position shown in FIG. 19C, the swing member 7 is so activated that the advancing/retracting rod 49 of each of the traveling module 1D in the first position and the traveling module 1B in the third position protrudes, but the advancing/retracting rod 49 of the traveling module 1C in the second position retracts. The advancing/retracting rod 49 of the traveling module 1A in the fourth position is a free end and hence does not affect the pivotal motion. The action of the three swing members 7 of the traveling module 1D in the first position to the traveling module 1B in the third position causes the traveling module connected unit 80 to be zigzagged in a serpentine shape in the plane described above, as shown in FIGS. 14A to 14D. At this point, the pair of idler wheels 83, 84 and the four pairs of traveling wheels 3A to 3D and 4A to 4D are in contact with the inner surface of the intermediate segment 102, as shown in the insets A to E in FIG. 16.

Figure 20A:
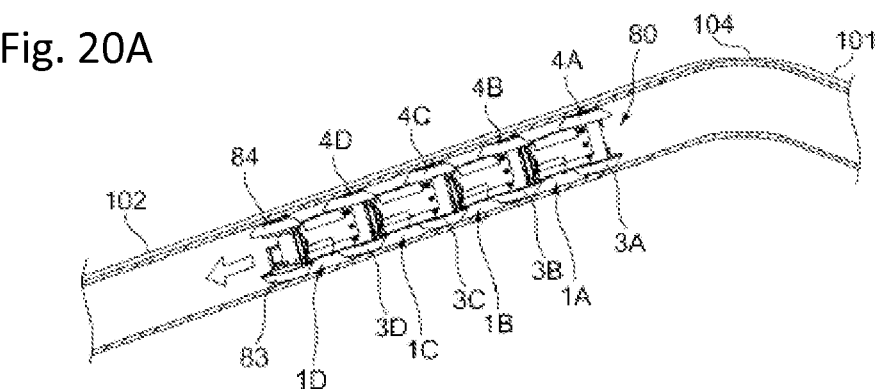
FIG. 20A is a descriptive diagram showing a state in which the traveling module connected unit in the state shown in FIG. 19C pivots by about 30 degrees in the other intermediate linear segment of the L-shaped pipe.
Figure 20B:
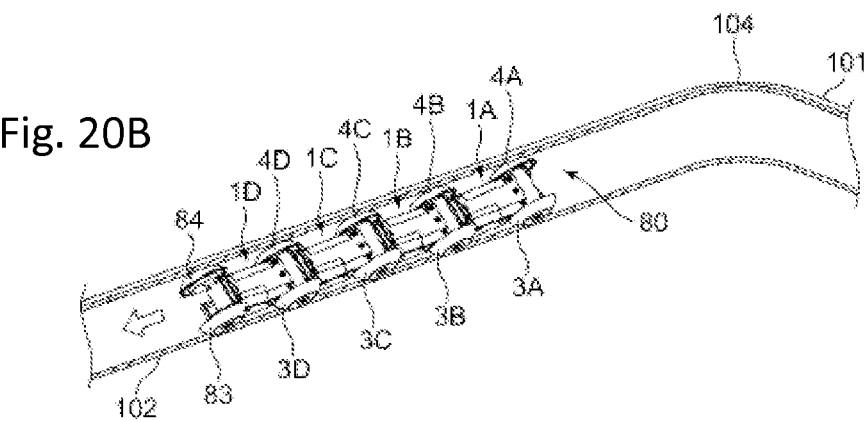
FIG. 20B is a descriptive diagram showing a state in which the traveling module connected unit in the state in FIG. 20A pivots by about 30 degrees.
Figure 20C:
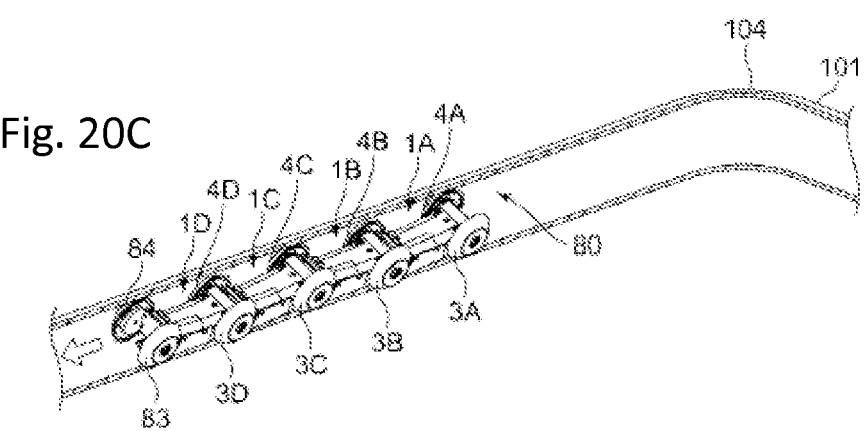
FIG. 20C is a descriptive diagram showing a state in which the traveling module connected unit in the state in FIG. 20B further pivots by about 30 degrees.
Figure 21A:
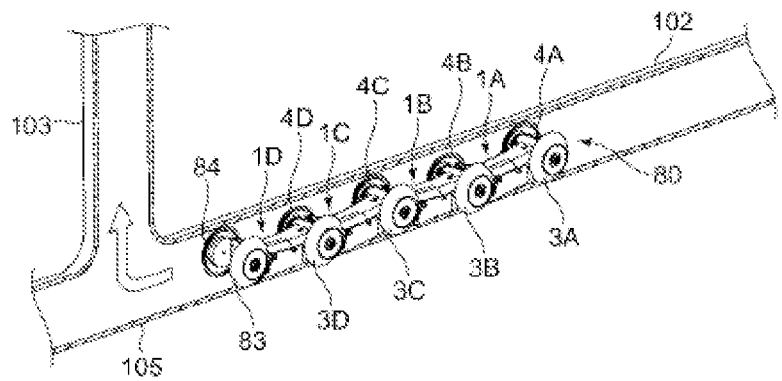
FIG. 21A is a descriptive diagram showing a state in which the traveling module connected unit travels along the other intermediate linear segment of the L-shaped pipe and approaches a vertical linear segment.
Figure 21B:
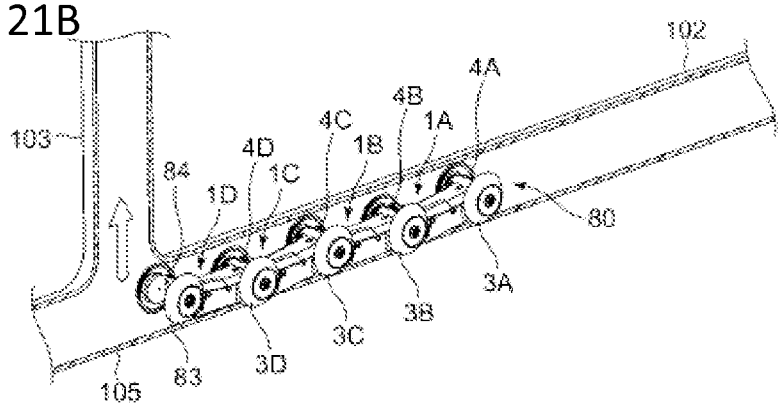
FIG. 21B is a descriptive diagram showing a state immediately before the traveling module connected unit having undergone the state in FIG. 21A enters the vertical linear segment.
Figure 21C:
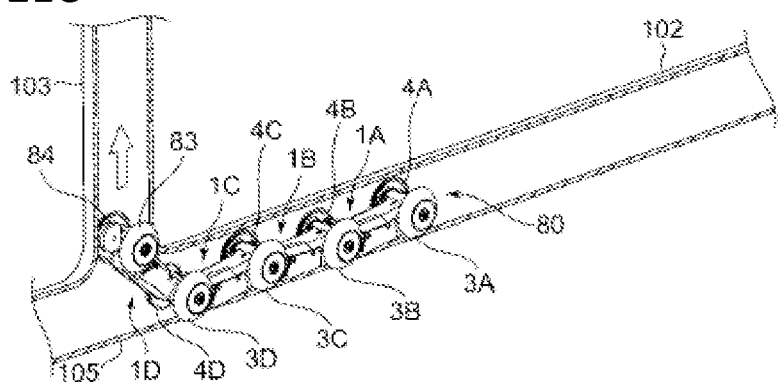
FIG. 21C is a descriptive diagram showing a state in which the first traveling wheels has entered the vertical linear segment.

As a result, the traveling module connected unit 80 moves forward in the traveling direction while rotating, undergoes the states shown in FIGS. 20A, 20B, and 20C, and changes its attitude from the state shown in FIG. 19C to an attitude having pivoted by about 90 degrees, as shown in FIG. 21A. In this state, when the traveling module connected unit reaches the T-shaped segment 105, the spring forces of the coil springs 40 exert a restoration force on the traveling module connected unit 80 in such a way that the traveling module connected unit 80 restores the initial attitude thereof shown in FIGS. 12A to 12D, whereby the traveling module connected unit 80 undergoes the state shown in FIG. 21B and the pair of idler wheels 83, 84 provided in the traveling module 1D in the first position enter the vertical segment 103, as shown in FIG. 21C.

Figure 22A:
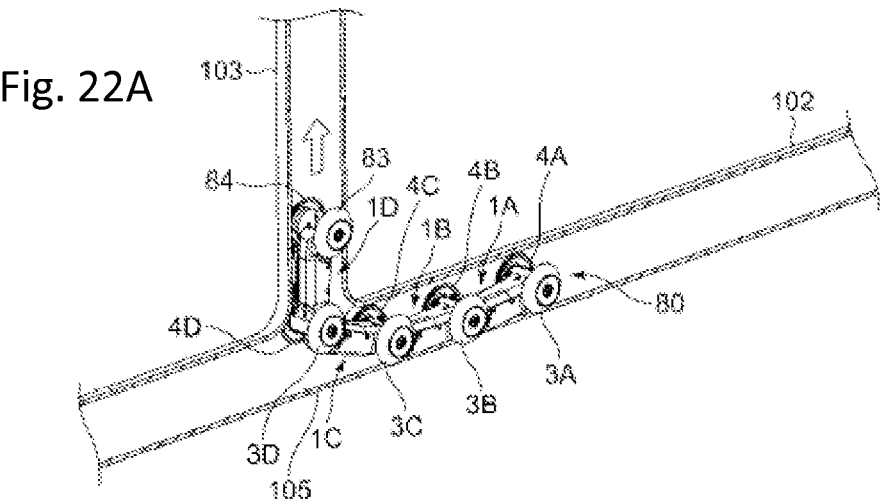
FIG. 22A is a descriptive diagram showing a state in which the second traveling wheels enter the vertical linear segment.
Figure 22B:
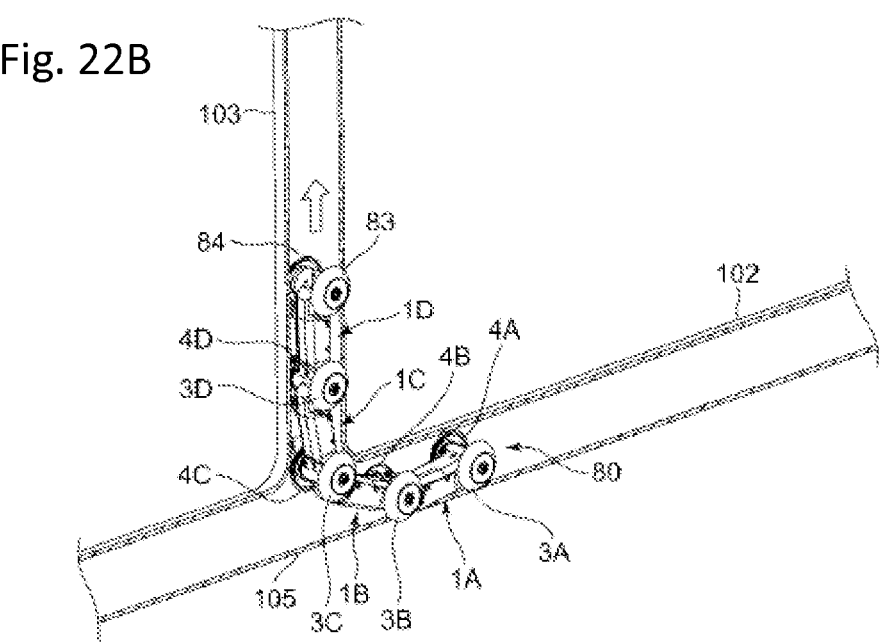
FIG. 22B is a descriptive diagram showing a state in which the third traveling wheels enter the vertical linear segment.
Figure 23:
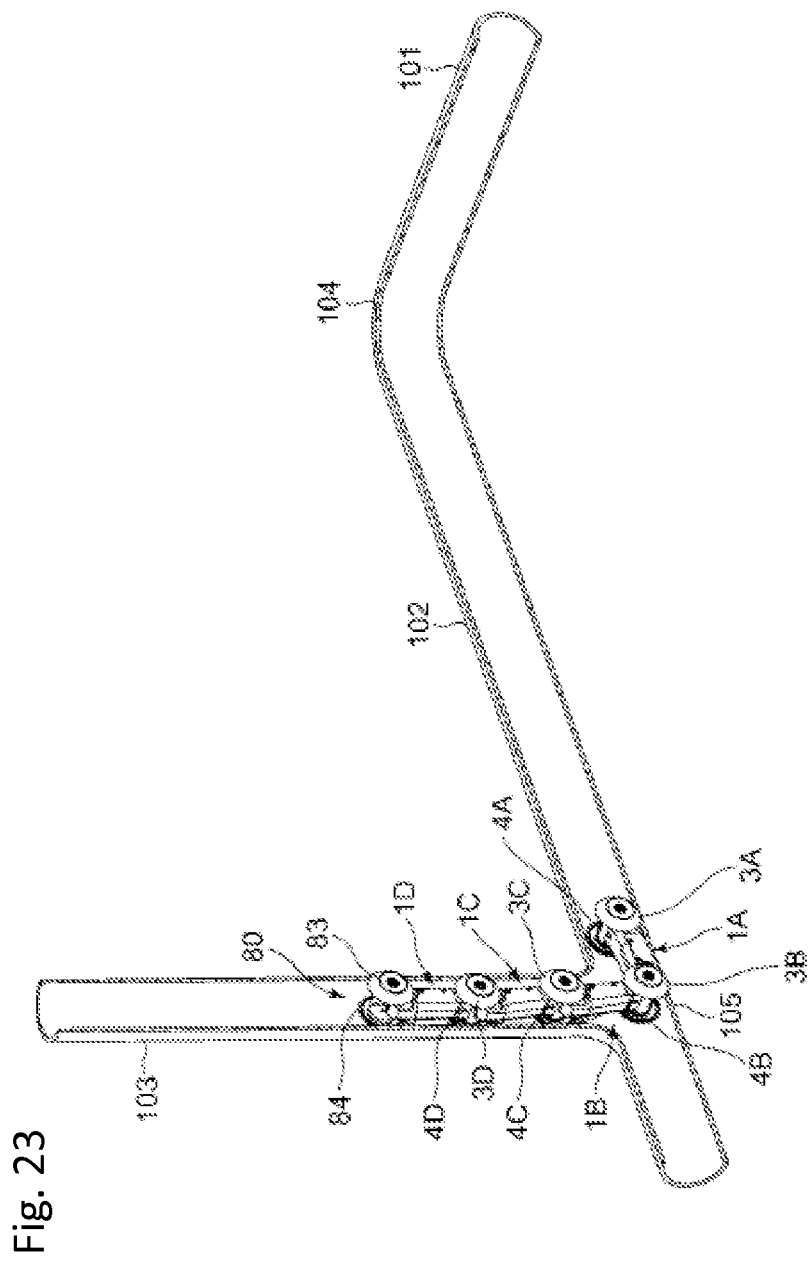
FIG. 23 describes how the traveling module connected unit according to the embodiment of the in-pipe traveling apparatus of the invention travels and is a descriptive diagram showing a state in which the third traveling wheels have entered the vertical linear segment.

Following the pair of idler wheels 83, 84, the pair of traveling wheels 3D, 4D provided in the traveling module 1D in the first position enter the vertical segment 103, as shown in FIGS. 22A and 22B. The pair of traveling wheels 3C, 4C provided in the traveling module 1C in the second position then enter the vertical segment 103, as shown in FIG. 23. The pair of traveling wheels 3B, 4B provided in the traveling module 1B in the third position and the pair of traveling wheels 3A, 4A provided in the traveling module 1A in the fourth position then successively enter the vertical segment 103 in the same manner. After the entire traveling module connected unit 80 enters the vertical segment 103, the traveling module connected unit 80 can move straight in the linear state without pivotal motion along the vertical segment 103.

The traveling module according to the invention was manufactured, and the traveling module was connected to another multiple times to form the traveling module connected unit. The number of traveling modules is four in total. The distance between the wheel shaft in an upstream traveling module and the wheel shaft in a downstream traveling module (hereinafter referred to as "inter-wheel-shaft distance in adjacent traveling modules") is 120 mm. The distance between the leading wheel shaft and the last wheel shaft in the traveling module connected unit (hereinafter referred to as "inter-wheel-shaft distance in traveling module connected unit") is therefore 480 mm. The diameter of each of the traveling wheels is 60 mm.

As a comparative example of the invention, a traveling module of related art was manufactured. The traveling module of related art was connected to another multiple times and the tension adjustment section was connected to the traveling modules to form a traveling module connected unit. The number of traveling modules is six in total. The inter-wheel-shaft distance in adjacent traveling modules is 120 mm, and the distance between the wheel shaft in an upstream traveling module to the wheel shaft in the downstream tension adjustment section (hereinafter referred to as "inter-wheel-shaft distance associated with tension adjustment section") is 1500 mm. The inter-wheel-shaft distance in the traveling module connected unit is therefore 2220 mm.

The traveling module connected unit of the invention and the traveling module connected unit of related art were placed in a pipe and allowed to travel. The pipe has the shape shown in FIG. 17, that is, the L-shaped segment and the vertical linear segment extending from the other intermediate linear segment. The inner diameter of the pipe is 78 mm. In the other intermediate linear segment of the pipe, the distance from the point where the curved surface of the L-shaped segment ends to the point where the curved surface of the vertical linear segment starts (hereinafter referred to as "distance of intermediate linear segment") is 780 mm. As described above, having completely passed through the L-shaped segment, the traveling module connected unit needs to pivot by 90 degrees in the intermediate linear segment.

The traveling module connected unit of the invention was placed in the pipe and allowed to travel. After the entire traveling module connected unit passed completely through the L-shaped segment (see FIG. 19C), the traveling module connected unit successfully pivoted by 90 degrees in the intermediate linear segment (see FIG. 21A). The traveling module connected unit then successfully traveled along the vertical segment. Since the distance of the intermediate segment is 780 mm, and the inter-wheel-shaft distance in the traveling module connected unit is 480 mm, it is ascertained that the traveling module connected unit according to the invention can pivot by 90 degrees while traveling a 300-mm-long linear portion.

The traveling module connected unit of related art was placed in the pipe and allowed to travel. When the front end of the traveling module connected unit reached the vertical linear segment, the tension adjustment section was still located in the L-shaped segment of the pipe. The body of the tension adjustment section was formed of a spring and an elastic tube that accommodates the spring and was curved when located in the L-shaped segment of the pipe. Since the distance of the intermediate linear segment was 780 mm, and the inter-wheel-shaft distance in the traveling module connected unit was 2220 mm, the entire traveling module connected unit of related art could not completely pass through the L-shaped segment.

The reason why the number of traveling modules in the traveling module connected unit of the invention is four in total but the number of traveling modules in the traveling module connected unit of related art is six in total will be described.

The number of traveling modules in the traveling module connected unit of the invention is four in total. The traveling module connected unit therefore has four pairs of traveling wheels. The traveling module connected unit of the invention includes the swing member that causes adjacent interconnected traveling modules to swing and the elastic member that exerts a spring force on the adjacent traveling modules. The swing member and the elastic member are provided in all the adjacent interconnected traveling modules. Further, the strength of each of the swing members can be adjusted to a large value. Similarly, the strength of each of the elastic members can be adjusted to a large value. A uniform, large moment can therefore be applied to all the traveling wheels. As a result, a large frictional force can be produced between the inner surface of a pipe and the traveling wheels. Even when a pipe has a small inner diameter, a large frictional force can be produced irrespective of the size of the inner diameter. The traveling module connected unit of the invention can therefore travel through a pipe with no slippage between the traveling wheels and the inner surface of the pipe. The four pairs of traveling wheels therefore suffice.

The number of traveling modules in the traveling module connected unit of related art is six in total. The traveling module connected unit therefore has six pairs of traveling wheels. To allow adjacent interconnected traveling modules to swing, and to apply a spring force to the adjacent traveling wheels, the traveling module connected unit of related art includes two cables and two springs connected to the respective cables. The two cables are shared by all the adjacent interconnected traveling modules. A moment therefore needs to be applied to each of the traveling wheels by using only the two cables, and the amount of moment applied to each of the traveling wheels is therefore limited. Further, since each of the cables is subject to a large frictional force in a portion where the cable is bent, the tension of the cable decreases with distance from the tension adjustment section. Moreover, when a pipe has a small inner diameter, the size of each of the traveling modules decreases, resulting in a decrease in the moment produced by each of the cables. Further, attempts to use a strong spring and increase the force that drives the tension adjustment section that adjusts the tension of each of the cables encounter limitation of providing a large drive section that produces a large drive force when a pipe has a small inner diameter. As a result, a large frictional force cannot be produced between the inner surface of the pipe and the traveling wheels. When the inner diameter of the pipe decreases, the tendency described above increases, and a large frictional force cannot be produced. As a result, in the traveling module connected unit of related art, slippage occurs between the traveling wheels and the inner surface of a pipe. To prevent the slippage, at least six pairs of traveling wheels are required.

The invention has been described above, but the invention is not limited to the embodiment described above, and a variety of variations are conceivable to the extent that the doctrine of equivalents applies. For example, the above embodiment has been described with reference to the case where four traveling modules are interconnected to form a single traveling module connected unit, but the number of traveling modules may be three, or five or more traveling modules may, of course, be interconnected to form a traveling module connected unit.

The number of pairs of traveling wheels provided in a traveling module connected unit preferably ranges from three to five. It is noted that the traveling module connected unit includes a pair of idler wheels as well as the traveling wheels. When the number of pairs of traveling wheels is three or greater, the traveling wheels and the idler wheels can be pressed against the inner wall of a pipe with a sufficient amount of force, which is advantageous because the traveling module connected unit can be held within a pipe. When the number of pairs of traveling wheels is five or smaller, the traveling module connected unit is allowed to pivot with a sufficient margin in a pipe having a short linear segment.

A pipe through which the traveling module connected unit of the invention is allowed to travel preferably has an inner diameter ranging from 60 to 250 mm. When the inner diameter of a pipe is 60 mm or greater, a sufficient space is provided, which is advantageous because a large-torque motor for travel operation can be used. When the inner diameter of a pipe is 250 mm or smaller, the inter-wheel-shaft distance in the traveling module connected unit can be advantageously shortened because the number of traveling wheels in the traveling module connected unit of the invention can be smaller than the number of traveling wheels in the traveling module connected unit of related art.

The invention claimed is:

1. An in-pipe traveling apparatus characterized in that:
the in-pipe traveling apparatus comprises at least three traveling modules capable of passing through a pipe,
each of the traveling modules includes a traveling module body inserted into a pipe, a pair of traveling wheels inserted into the pipe and provided in the traveling module body on one side thereof in a traveling direction, a drive member that drives the pair of traveling wheels in such a way that the traveling wheels rotate, a connection member provided in the traveling module body and connecting the traveling module to another traveling module in a bendable manner in a pitching direction, and a swing member that causes the adjacent traveling module connected via the connection member to swing in a yawing direction, the connection member having a first member provided in the traveling module body on one side thereof in the traveling direction and a second member provided in the traveling module body on the other side thereof in the traveling direction,
all the traveling modules are interconnected in line via the connection members to form a traveling module connected unit, an elastic member is so provided that the elastic member is interposed between adjacent traveling modules in the traveling module connected unit, a spring force of the elastic member is used to elastically bend the traveling module connected unit in the pitching direction, the first member is formed of an end surface bracket pivotally supported by the traveling module body, and the second member is formed of a swingable bracket swingably supported by the traveling module body, in adjacent traveling modules in the traveling module connected unit, the end surface bracket of a traveling module is fixed to the swingable bracket of an adjacent traveling module, and the swingable bracket is fixed to the end surface bracket of another adjacent traveling module, a drive system that produces swing motion in a yawing direction is provided between the first member and the second member, the elastic member is formed of a coil spring, and one end of each of the coil springs is locked to the corresponding traveling module body, and the other ends of the coil springs are twisted alternately in opposite directions and caused to engage with the respective first member, so that the spring forces of the coil springs that are present between the adjacent traveling modules act alternately in a direction opposite to a tangential direction to bend the traveling module connected unit zigzag.

2. The in-pipe traveling apparatus according to claim 1, characterized in that each pair of the plurality of traveling wheels is so disposed on the traveling module connected unit on opposite sides thereof in a direction that intersects the traveling direction and so formed that outer surfaces of the wheels as a whole form part of a sphere.

3. An in-pipe traveling apparatus, characterized in that:

the in-pipe traveling apparatus comprises at least three traveling modules capable of passing through a pipe, each of the traveling modules includes a traveling module body inserted into a pipe, a pair of traveling wheels inserted into the pipe and provided in the traveling module body on one side thereof in a traveling direction, a drive member that drives the pair of traveling wheels in such a way that the traveling wheels rotate, a connection member provided in the traveling module body and connecting the traveling module to another traveling module in a bendable manner in a pitching direction, and a swing member that causes the adjacent traveling module connected via the connection member to swing in a yawing direction, the connection member having a first member provided in the traveling module body on one side thereof in the traveling direction and a second member provided in the traveling module body on the other side thereof in the traveling direction, all the traveling modules are interconnected in line via the connection members to form a traveling module connected unit, an elastic member is so provided that the elastic member is interposed between adjacent traveling modules in the traveling module connected unit, a spring force of the elastic member is used to elastically bend the traveling module connected unit in the pitching direction, and a pair of idler wheels are rotatably provided in the traveling module connected unit on the side thereof away from the traveling wheels on the one side in the traveling direction, the first member is formed of an end surface bracket pivotally supported by the traveling module body, and the second member is formed of a swingable bracket swingably supported by the traveling module body, in adjacent traveling modules in the traveling module connected unit, the end surface bracket of a traveling module is fixed to the swingable bracket of an adjacent traveling module, and the swingable bracket is fixed to the end surface bracket of another adjacent traveling module, a drive system that produces swing motion in a yawing direction is provided between the first member and the second member, the elastic member is formed of a coil spring, and one end of each of the coil springs is locked to the corresponding traveling module body, and the other ends of the coil springs are twisted alternately in opposite directions and caused to engage with the respective first member, so that the spring forces of the coil springs that are present between the adjacent traveling modules act alternately in a direction opposite to a tangential direction to bend the traveling module connected unit zigzag.

* * * * *